(12) United States Patent
Tanaka et al.

(10) Patent No.: US 10,430,684 B2
(45) Date of Patent: Oct. 1, 2019

(54) SIGNAL PROCESSOR AND SIGNAL PROCESSING METHOD

(71) Applicant: CANON KABUSHIKI KAISHA, Tokyo (JP)

(72) Inventors: Wakako Tanaka, Inagi (JP); Tomokazu Ishikawa, Yokohama (JP); Yoshinori Mizoguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 15/711,295

(22) Filed: Sep. 21, 2017

(65) Prior Publication Data

US 2018/0096218 A1    Apr. 5, 2018

(30) Foreign Application Priority Data

Sep. 30, 2016 (JP) .................................. 2016-194064

(51) Int. Cl.
 *G06K 9/46* (2006.01)
 *G06K 9/00* (2006.01)
 (Continued)

(52) U.S. Cl.
 CPC ............. *G06K 9/46* (2013.01); *G06K 9/0051* (2013.01); *G06K 9/00986* (2013.01);
 (Continued)

(58) Field of Classification Search
 CPC ...... B41J 2/2139; B41J 2/2132; B41J 2/2142; G06K 9/036; G06T 5/002; G06T 5/003;
 (Continued)

(56) References Cited

U.S. PATENT DOCUMENTS

| 8,503,031 B2 | 8/2013 | Kajihara |
| 8,619,319 B2 | 12/2013 | Tsuchiya |

(Continued)

FOREIGN PATENT DOCUMENTS

| EP | 3 226 533 A1 | 10/2017 |
| EP | 3 226 534 A1 | 10/2017 |

(Continued)

OTHER PUBLICATIONS

Zhang Si-Bing, "Research on Image Enhancement by Stochastic Resonance in Bistable System", IEEE, vol. 7, Apr. 16, 2010, pp. 453-456.

(Continued)

*Primary Examiner* — Sheela C Chawan
(74) *Attorney, Agent, or Firm* — Venable LLP

(57) ABSTRACT

A signal processing method includes addition of noise obtained by multiplying generated random number by K to the input pixel signal I(x), a binarization process of comparing the result of the addition with two thresholds, and a process of calculating a probability. The binarization process includes a first nonlinear process and a second nonlinear process. The first nonlinear process outputs "P" in a case where I(x) after the addition of the noise is greater than the threshold T1 and less than the second threshold T2. The second nonlinear determines "1" or "0" for a processing target pixel, in which the result of the first nonlinear process is "P," based on input pixel signals of pixels around the processing target pixel. The process of calculating a probability calculates a probability J(x) that the result of the first nonlinear process is "1," or the result of the first nonlinear process is "P" and the result of the second nonlinear process is "1".

28 Claims, 22 Drawing Sheets

(51) Int. Cl.
*G06K 9/03* (2006.01)
*G06T 5/00* (2006.01)
*G06T 7/00* (2017.01)
*H04N 1/50* (2006.01)
*H04N 1/409* (2006.01)
*G06K 9/62* (2006.01)

(52) U.S. Cl.
CPC .............. *G06K 9/036* (2013.01); *G06T 5/002* (2013.01); *G06T 7/0002* (2013.01); *H04N 1/409* (2013.01); *H04N 1/504* (2013.01); *G06K 9/00442* (2013.01); *G06K 9/6212* (2013.01); *G06T 2207/10004* (2013.01); *G06T 2207/20076* (2013.01)

(58) Field of Classification Search
CPC ......... G06T 5/006; G06T 5/007; G06T 5/008; G06T 5/50; G06T 2207/20076; G06T 2207/30144; H04N 1/40; H04N 1/58; H04N 1/6041; H04N 5/23232; H04N 5/357
USPC ....... 382/254, 260, 162, 167, 275, 264, 266, 382/263, 274, 100, 128, 132, 13, 1, 165, 382/181, 190, 195, 199; 348/629, 441, 348/246, 241, 222.1, 207.99, 571, 625, 348/628; 358/1.9, 3.26, 400, 443, 448, 358/463, 3.27, 500, 524
See application file for complete search history.

(56) References Cited

U.S. PATENT DOCUMENTS

| | | | |
|---|---|---|---|
| 8,830,530 B2 | 9/2014 | Sano | |
| 9,064,202 B2 | 6/2015 | Tanaka | |
| 9,087,291 B2 | 7/2015 | Hori | |
| 9,092,720 B2 | 7/2015 | Nakagawa | |
| 9,210,292 B2 | 12/2015 | Miyake | |
| 9,576,769 B2* | 2/2017 | Kanai | H01J 37/22 |
| 9,623,670 B2 | 4/2017 | Kagawa | |
| 9,649,839 B2 | 5/2017 | Ishikawa | |
| 9,715,636 B2 | 7/2017 | Ikeda | |
| 2007/0280551 A1* | 12/2007 | Oztan | H04N 19/86 382/268 |
| 2010/0020204 A1* | 1/2010 | Fleischer | G01R 33/0029 348/241 |
| 2016/0203589 A1* | 7/2016 | Dzyubak | G06T 5/002 382/131 |
| 2017/0004360 A1 | 1/2017 | Tanaka | |
| 2017/0004376 A1 | 1/2017 | Hori | |
| 2017/0004614 A1 | 1/2017 | Suwa | |
| 2018/0048917 A1* | 2/2018 | Metzler | H04N 19/91 |

FOREIGN PATENT DOCUMENTS

| | | |
|---|---|---|
| EP | 3 242 272 A1 | 11/2017 |
| JP | 2002-221546 | 8/2002 |
| JP | 2008-9549 | 1/2008 |

OTHER PUBLICATIONS

Rajib Kumar Jha, et al., "Improving Watermark Detection Performance Using Suprathreshold Stochastic Resonance", IEEE, Nov. 21, 2010, pp. 691-696.

European Search Report dated Feb. 14, 2018 in European Application No. 17192542.3.

J.J. Collins, et al., "Stochastic resonance without tuning", Nature, (UK), Jul. 20, 1995, vol. 376, pp. 236-238.

U.S. Appl. No. 15/482,183, filed Apr. 7, 2017, by Tetsuya Suwa et al.

U.S. Appl. No. 15/493,526, filed Apr. 21, 2017, by Tomokazu Ishikawa et al.

* cited by examiner

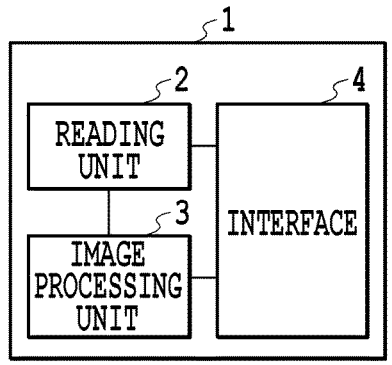
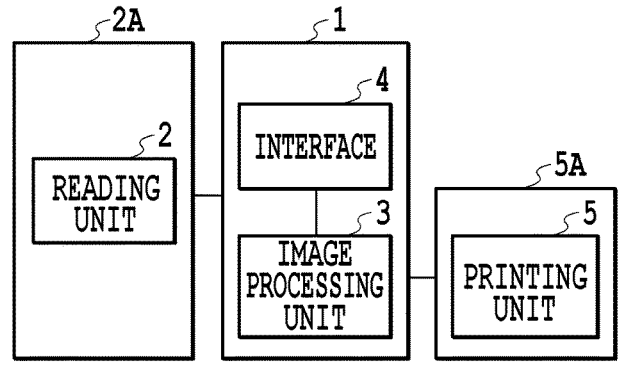
FIG.2A    FIG.2B
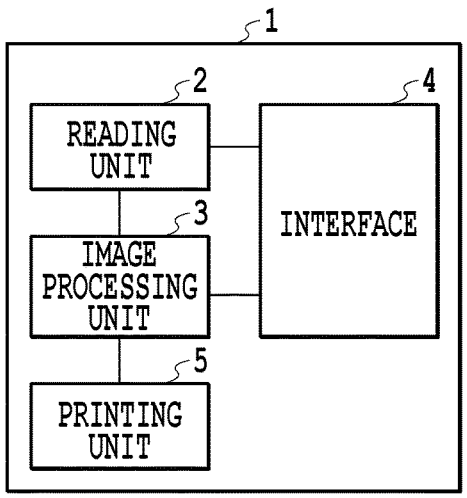
FIG.2C
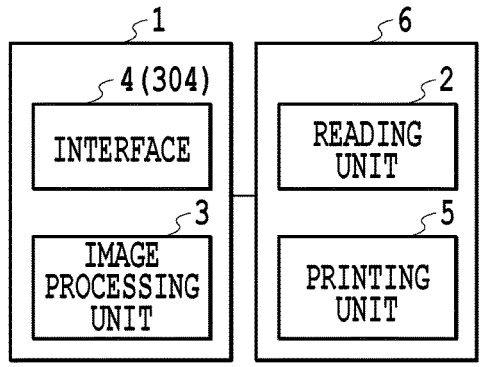
FIG.2D

FIG.14A FIG.14B FIG.14C

SIGNAL PROCESSOR AND SIGNAL PROCESSING METHOD

BACKGROUND OF THE INVENTION

Field of the Invention

The present invention relates to a signal processor and a signal processing method for extracting a detection target signal from an input signal in which the detection target signal is buried in noise.

Description of the Related Art

Stochastic resonance is used to extract a detection target signal from an input signal buried in noise. Stochastic resonance is a phenomenon where a detection target signal is emphasized by adding noise to an input signal buried in noise and then performing a nonlinear process. Japanese Patent Laid-Open No. 2002-221546 explains a basic feature that the evaluation value of the extraction result varies according to the intensity of the added noise in this case. That is, the noise intensity should be tuned in the case of extracting a detection target signal using stochastic resonance.

J. J. Collins, Carson C. Chow, and Thomas T. Imhoff, "Stochastic resonance without tuning," NATURE, (UK), 20 Jul. 1995, vol. 376, pp. 236-238 (hereinafter referred to as Non-patent Literature 1) discloses that, as shown in FIG. 1, the input signal I(x) is branched to a plurality of pieces and different noises are added to the respective pieces and the resultant pieces are subjected to a nonlinear processing to further synthesize the outputs thereof to thereby detect a detection target signal at a stable accuracy. According to Non-patent Literature 1, a correlation coefficient becomes stable as the number of branches M increases. Accordingly, the optimal value of the noise intensity as disclosed in Japanese Patent Laid-Open No. 2002-221546 does not exist and there is no need to tune the noise intensity.

Japanese Patent Laid-Open No. 2008-9549 discloses a method of processing a processing target signal by using surrounding signals as well as stochastic resonance. More specifically, in the case of extracting a singular portion from a plurality of pieces of pixel data obtained by capturing an image, data on a target pixel is processed using a reaction-diffusion equation consisting of a reaction term that reflects stochastic resonance and a diffusion term that reflects data on surrounding pixels. The adoption of the method disclosed in Japanese Patent Laid-Open No. 2008-9549 makes it possible to determine whether a target pixel is included in a singular portion with higher accuracy at the time of edge detection and region segmentation in an image.

Incidentally, the above-described extraction process of a detection target signal using stochastic resonance can be used for product inspection or the like. For example, a singular portion such as a scratch in a produced product can be extracted by capturing the product to obtain image data and subjecting the image data to the above-described process. If such an extraction step, a step of displaying the extracted singular portion in a popup window, and a step of checking the image in the popup window and making a final decision by a tester are provided, time required for inspection can be greatly reduced and the inspection accuracy can be improved compared with the case of only visual inspection by an tester. Further, such a singular portion extraction mechanism can be provided not only in the inspection process in the production site but also in a product itself. For example, a personal printer may have a function of capturing a printed image and, if a failure occurs, automatically extracting it.

If image processing is executed for detecting a singular portion using the method disclosed in Non-patent Literature 1, however, several hundred or thousand nonlinear processes should be executed in parallel to obtain the advantageous result, which increases processing load. In the case of using the reaction-diffusion equation disclosed in Japanese Patent Laid-Open No. 2008-9549, since pixel values are changed with time using a differential equation, the temporal change in image should be monitored each time it occurs and operations should be repeated to a stable state, which also leads to an enormous increase in processing load.

SUMMARY OF THE INVENTION

The present invention has been accomplished in order to solve the above problem. Accordingly, the present invention aims to provide an image processor and an image processing method capable of extracting a singular portion in an image based on information on surrounding pixels using stochastic resonance with a relatively simple configuration.

According to a first aspect of the present invention, there is provided a signal processor comprising: an acquisition unit configured to acquire input pixel signals I(x) corresponding to two-dimensionally arranged pixels (x), respectively; and a processing unit configured to apply a predetermined stochastic resonance process to each of the input pixel signals I(x) acquired by the acquisition unit, wherein the predetermined stochastic resonance process includes addition of noise obtained by multiplying generated random number by K to the input pixel signal I(x), a binarization process of comparing the result of the addition of the noise to the input pixel signal I(x) with a threshold T2 and a threshold T1 (where T2>T1), and a process of calculating a probability related to the result of the binarization process, the binarization process includes: a first nonlinear process of outputting "0" in a case where the input pixel signal I(x) after the addition of the noise is less than the threshold T1, "1" in a case where the input pixel signal I(x) after the addition of the noise is greater than the threshold T2, and "P" in a case where the input pixel signal I(x) after the addition of the noise is greater than or equal to the threshold T1 and less than or equal to the second threshold T2; and a second nonlinear process of determining whether to output "1" or "0" for a processing target pixel, in which the result of the first nonlinear process is "P," based on input pixel signals of pixels around the processing target pixel, the second nonlinear process being subsequent to the first nonlinear process, and the process of calculating a probability is a process of calculating a probability J(x) that the result of the first nonlinear process is "1," or the result of the first nonlinear process is "P" and the result of the second nonlinear process is "1" in the binarization process.

According to a second aspect of the present invention, there is provided a signal processor comprising: an acquisition unit configured to acquire input pixel signals I(x) corresponding to two-dimensionally arranged pixels (x), respectively; and a processing unit configured to apply a predetermined stochastic resonance process to each of the input pixel signals I(x) acquired by the acquisition unit, wherein the predetermined stochastic resonance process includes addition of noise obtained by multiplying generated random number by K to the input pixel signal I(x), a first process of obtaining Rate1, RateP, and RateP1 by using the result of the addition of the noise to the input pixel signal I(x) and two thresholds T2 and T1 (where T2>T1), and a second process of obtaining an output signal J(x) from Rate1, RateP, and RateP1, wherein (I) on the assumption that, in a case where the random numbers N is greater than 0 and less than 1, a probability that random numbers N is generated is expressed by f(N), (I-i) the first process obtains Rate1 based on the following formula:

$$Rate1 = \begin{cases} 1 & \text{Pixel where } A2 < 0 \\ 0 & \text{Pixel where } A2 > 1 \\ 1 - \int_{N=0}^{A2} f(N)dN & \text{Pixel where } 0 \leq A2 \leq 1 \end{cases}$$

$$\text{where } A2 = \frac{\{T2 - I(x)\}}{K},$$

(I-ii) the first process obtains RateP based on the following formula:
in a case where A2−A1>1, $$RateP = \begin{cases} 0 & \text{Pixel where } A1 < 0 \\ 1 - \int_{N=0}^{A2} f(N)dN & \text{Pixel where } 0 \leq A2 \leq 1 \text{ and } A1 < 0 \\ 1 & \text{Pixel where } 1 < A2 \text{ and } A1 < 0 \\ 1 - \int_{N=A1}^{1} f(N)dN & \text{Pixel where } 1 \leq A2 \text{ and } 0 \leq A1 \leq 1 \\ 0 & \text{Pixel where } A1 > 1 \end{cases}$$

and in a case where A2−A1≤1, $$RateP = \begin{cases} 0 & \text{Pixel where } A2 < 0 \\ 1 - \int_{N=0}^{A2} f(N)dN & \text{Pixel where } 0 \leq A2 \leq 1 \text{ and } A1 < 0 \\ \int_{N=A1}^{A2} f(N)dN & \text{Pixel where } 0 < A1 \text{ and } A2 < 1 \\ 1 - \int_{N=A1}^{1} f(N)dN & \text{Pixel where } 1 \leq A2 \text{ and } 0 \leq A1 \leq 1 \\ 0 & \text{Pixel where } A1 > 1 \end{cases}$$

$$\text{where } A1 = \frac{T1 - I(x)}{K}, \text{ and}$$

(I-iii) the first process obtains RateP1 as a value corresponding to a probability that a value obtained by adding the noises to pixel signals of pixels around the processing target signal is greater than T2, and (II) the second process obtains the output signal J(x) based on the following formula:

$$J(x) = Rate1 + RateP \times RateP1$$

According to a third aspect of the present invention, there is provided a signal processing method comprising: an acquisition step of acquiring input pixel signals I(x) corresponding to two-dimensionally arranged pixels (x), respectively; and a processing step of applying a predetermined stochastic resonance process to each of the input pixel signals I(x) acquired in the acquisition step, wherein the predetermined stochastic resonance process includes addition of noise obtained by multiplying generated random number by K to the input pixel signal I(x), a binarization process of comparing the result of the addition of the noise to the input pixel signal I(x) with a threshold T2 and a threshold T1 (where T2>T1), and a process of calculating a probability related to the result of the binarization process, the binarization process includes: a first nonlinear process of outputting "0" in a case where the input pixel signal I(x) after the addition of the noise is less than the threshold T1, "1" in a case where the input pixel signal I(x) after the addition of the noise is greater than or equal to the threshold T2, and "P" in a case where the input pixel signal I(x) after the addition of the noise is greater than or equal to the threshold T1 and less than the second threshold T2; and a second nonlinear process of determining whether to output "1" or "0" for a processing target pixel, in which the result of the first nonlinear process is "P," based on input pixel signals of pixels around the processing target pixel, the second nonlinear process being subsequent to the first nonlinear process, and the process of calculating a probability is a process of calculating a probability J(x) that the result of the first nonlinear process is "1," or the result of the first nonlinear process is "P" and the result of the second nonlinear process is "1" in the binarization process.

According to a fourth aspect of the present invention, there is provided a non-transitory computer-readable storage medium storing a program for causing one or more processors to perform a control method comprising: an acquisition step of acquiring input pixel signals I(x) corresponding to two-dimensionally arranged pixels (x), respectively; and a processing step of applying a predetermined stochastic resonance process to each of the input pixel signals I(x) acquired in the acquisition step, wherein the predetermined stochastic resonance process includes addition of noise obtained by multiplying generated random number by K to the input pixel signal I(x), a binarization process of comparing the result of the addition of the noise to the input pixel signal I(x) with a threshold T2 and a threshold T1 (where T2>T1), and a process of calculating a probability related to the result of the binarization process, the binarization process includes: a first nonlinear process of outputting "0" in a case where the input pixel signal I(x) after the addition of the noise is less than the threshold T1, "1" in a case where the input pixel signal I(x) after the addition of the noise is greater than or equal to the threshold T2, and "P" in a case where the input pixel signal I(x) after the addition of the noise is greater than the threshold T1 and less than or equal to the second threshold T2; and a second nonlinear process of determining whether to output "1" or "0" for a processing target pixel, in which the result of the first nonlinear process is "P," based on input pixel signals of pixels around the processing target pixel, the second nonlinear process being subsequent to the first nonlinear process, and the process of calculating a probability is a process of calculating a probability J(x) that the result of the first nonlinear process is "1," or the result of the first nonlinear process is "P" and the result of the second nonlinear process is "1" in the binarization process.

Further features of the present invention will become apparent from the following description of exemplary embodiments with reference to the attached drawings.

BRIEF DESCRIPTION OF THE DRAWINGS

FIGS. 2A to 2D are diagrams showing examples of the form of a signal extraction processor in the present invention;

FIGS. 14A to 14C are diagrams showing the result J(x) of the stochastic resonance process;

DESCRIPTION OF THE EMBODIMENTS

Figure 1:
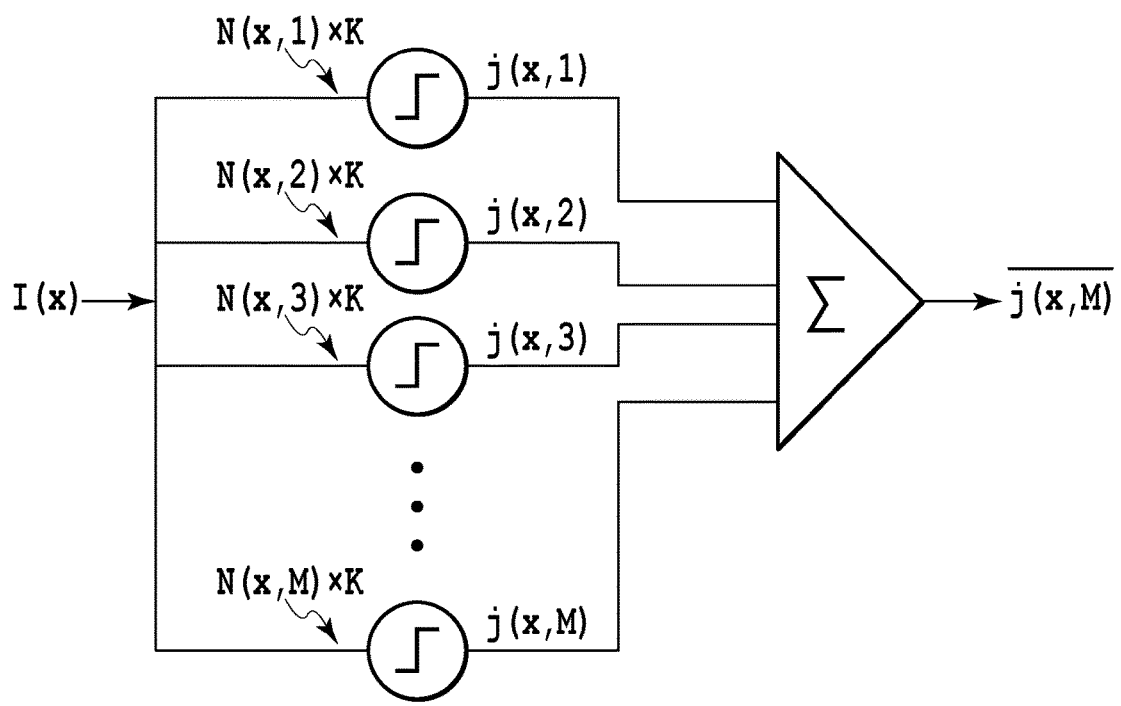
FIG. 1 is a diagram showing a stochastic resonance process disclosed in Non-patent Literature 1.

FIGS. 2A to 2D are diagrams showing examples of the form of an image processor 1 that can be used as a signal extraction processor of the present invention. The image processor of the present invention subjects captured image data to a popup process for allowing a user to easily recognize a white stripe or the like in a printed image and a process for making a determination by the processor itself. Various forms can be used for the system of the processor.

FIG. 2A shows a form in which the image processor 1 comprises a reading unit 2. This form is exemplified by a case where a predetermined image is printed on a sheet by an inkjet printing apparatus, the sheet is placed on a reader plate of the reading unit 2 in the image processor 1, the image on the sheet is captured by an optical sensor or the like to obtain image data, and the image data is processed by an image processing unit 3. The image processing unit 3 comprises a CPU and an image processing accelerator capable of executing processing faster than the CPU. The image processing unit 3 controls reading operation by the reading unit 2 and subjects received image data to a predetermined inspection process.

FIG. 2B shows a form in which an image processor 1 is externally connected to a reading apparatus 2A comprising a reading unit 2. For instance, a system in which a scanner is connected to a PC corresponds to this form. The connection may be made via a general communication protocol such as USB, GigE, or CameraLink. Image data read by the reading unit 2 is provided to the image processing unit 3 via an interface 4 and the image processing unit 3 subjects the received image data to a predetermined inspection process. In this form, the image processor 1 may be further externally connected to a printing apparatus 5A comprising a printing unit 5.

FIG. 2C shows a form in which an image processor 1 comprises a reading unit 2 and a printing unit 5. For instance, a multifunction printer having the functions of a scanner, printer, and image processor corresponds to this form. The image processing unit 3 controls all of printing operation in the printing unit 5, reading operation in the reading unit 2, an inspection process for an image read by the reading unit 2, and the like.

FIG. 2D shows a form in which an image processor 1 is externally connected to a multifunction printer 6 comprising a reading unit 2 and a printing unit 5. For instance, a system in which a PC is connected to a multifunction printer having the functions of a scanner and printer corresponds to this form. The image processor 1 of the present invention may take any of the forms shown in FIGS. 2A to 2D, but the embodiments will be described below using an example of an image inspection apparatus that takes the form of FIG. 2D.

First Embodiment

Figure 3:
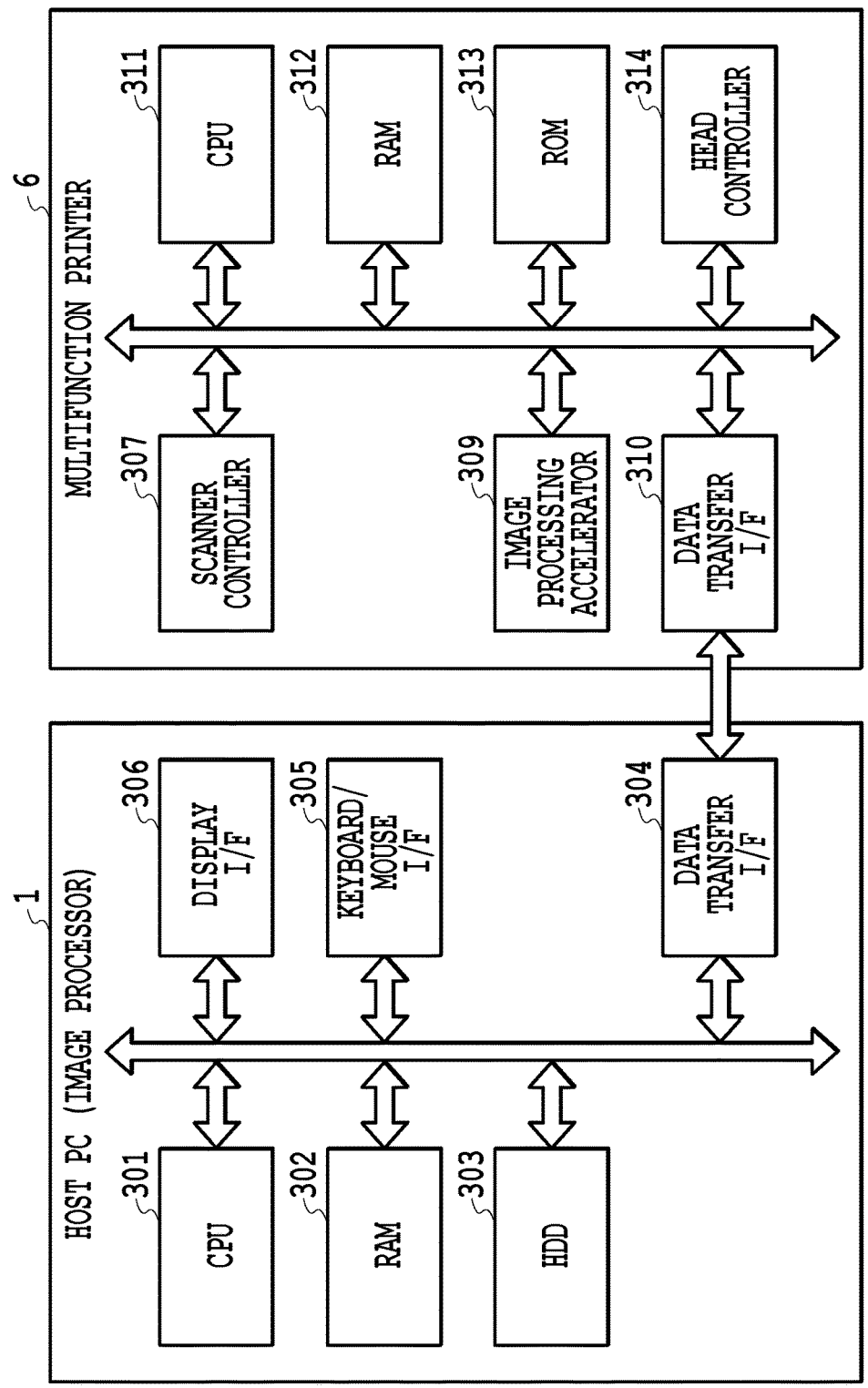
FIG. 3 is a block diagram showing the configuration of control in the signal extraction processor.

FIG. 3 is a block diagram showing the configuration of control in the form of FIG. 2D. The image processor 1 serving as a signal extraction processor is, for example, a host PC. A CPU 301 executes various processes using a RAM 302 as a work area in accordance with a program stored in an HDD 303. For instance, the CPU 301 generates image data that can be printed by the multifunction printer 6 in accordance with a command received from a user via a keyboard/mouse I/F 305 and a program stored in the HDD 303, and transfers the image data to the multifunction printer 6. The CPU 301 also executes a predetermined process for image data received from the multifunction printer 6 via a data transfer I/F 304 in accordance with a program stored in the HDD, and displays the result of the process and various types of information on a display (not shown) via a display I/F 306. Individual pixel signals I(x) of image data to be a target of a stochastic resonance process of the present embodiment as will be described later are received from the multifunction printer 6 via the data transfer I/F 304.

In the multifunction printer 6, a CPU 311 executes various processes using a RAM 312 as a work area in accordance with a program stored in a ROM 313. The multifunction printer 6 further comprises an image processing accelerator 309 for high-speed image processing, a scanner controller 307 for controlling the reading unit 2, and a head controller 314 for controlling the printing unit 5.

The image processing accelerator 309 is hardware capable of executing image processing faster than the CPU 311. The image processing accelerator 309 is activated by the CPU 311 writing parameters and data necessary for image processing to a predetermined address in the RAM 312. The image processing accelerator 309 reads the parameters and data and then subjects the data to predetermined image processing. It should be noted that the image processing accelerator 309 is not absolutely necessary and the same processing may be executed by the CPU 311.

The head controller 314 supplies print data to a printing head 100 provided in the printing unit 5 and controls printing operation of the printing head 100. The head controller 314 is activated by the CPU 311 writing print data that can be printed by the printing head 100 and control parameters to a predetermined address in the RAM 312 and executes ejection operation based on the print data.

The scanner controller 307 controls each of reading elements arrayed in the reading unit 2 and outputs, to the CPU 311, RGB brightness data obtained from the reading elements. The CPU 311 transfers the obtained RGB brightness data to the image processor 1 via a data transfer I/F 310. The connection between the data transfer I/F 304 of the image processor 1 and the data transfer I/F 310 of the multifunction printer 6 may be made via USB, IEEE1394, LAN or the like.

Figure 4:
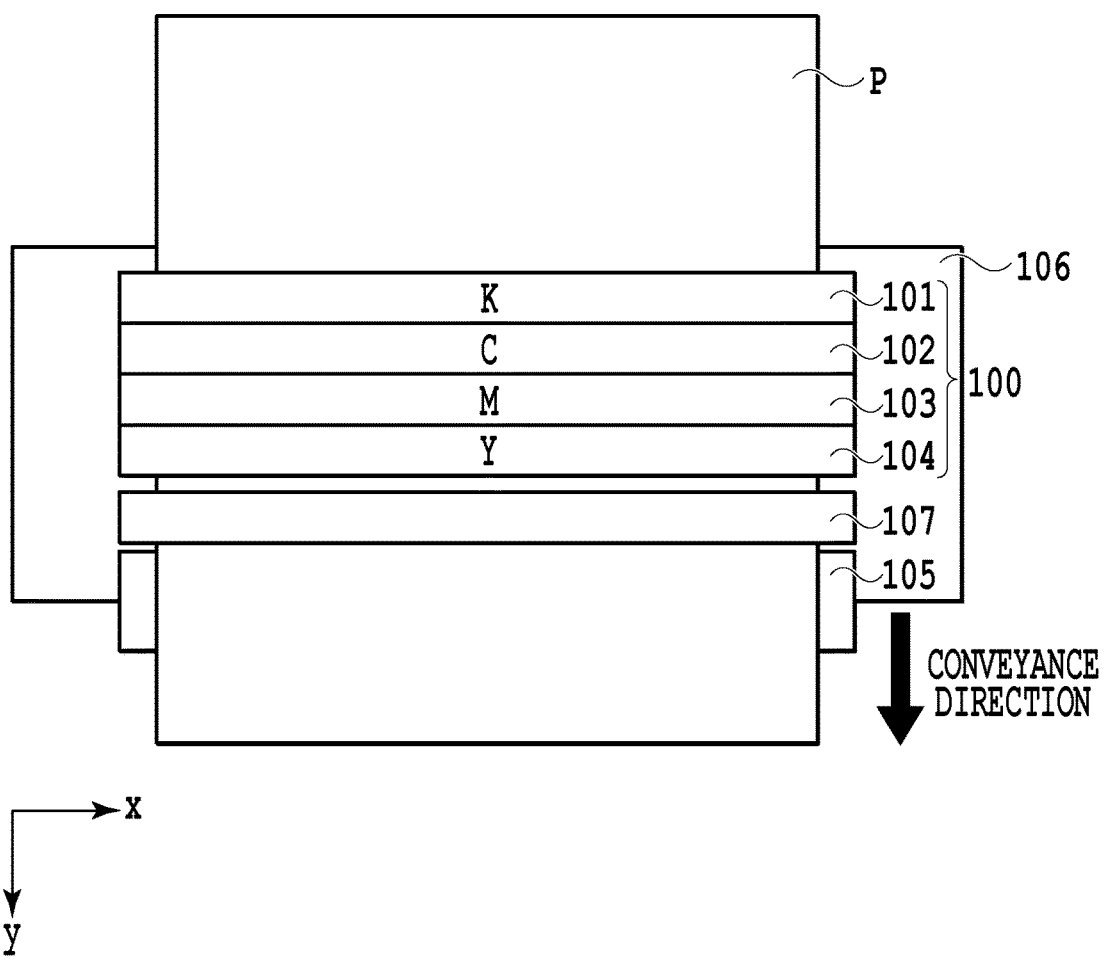
FIG. 4 is a schematic configuration diagram of an inkjet printing apparatus.

FIG. 4 is a schematic configuration diagram of an inkjet printing apparatus (hereinafter also simply referred to as a printing apparatus) that can be used as the multifunction printer 6 of the present embodiment. The printing apparatus of the present embodiment is a full-line type printing apparatus. A printing head 100 and a reading head 107, which are equal in width to a sheet P that can be a print medium and an inspection target, are arranged in parallel in a Y direction. The printing head 100 comprises four printing element arrays 101 to 104 that eject black ink (K), cyan ink (c), magenta ink (M), and yellow ink (Y), respectively. The printing element arrays 101 to 104 are arranged in parallel in a conveyance direction of the sheet P (the Y direction). The reading head 107 is provided downstream of the printing element arrays 101 to 104. The reading head 107 is equipped with reading elements for reading a printed image, which are arrayed in an X direction.

At the time of printing and reading processes, the sheet P is conveyed in the Y direction in the figure at a predetermined speed by the rotation of a conveying roller 105. During the conveyance, the printing head 100 executes a printing process and the reading head 107 executes a reading process. At the time of the printing process by the printing head 100 and the reading process by the reading head 107, the sheet P is supported from below by a platen 106, which is a flat plate, while maintaining the distances from the printing head 100 and the reading head 107 to the sheet P and the smoothness of the sheet P.

Figure 5A:
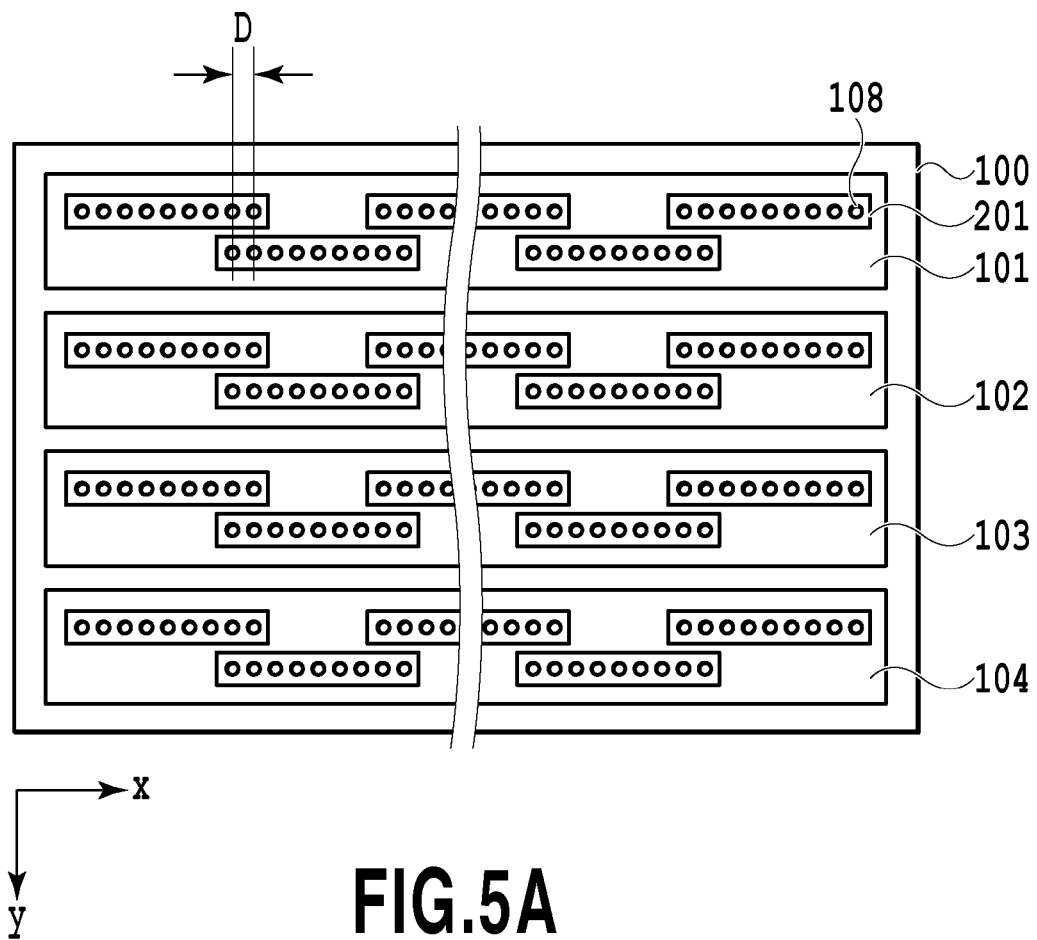
FIGS. 5A and 5B are configuration diagrams of a printing head and a reading head.
Figure 5B:
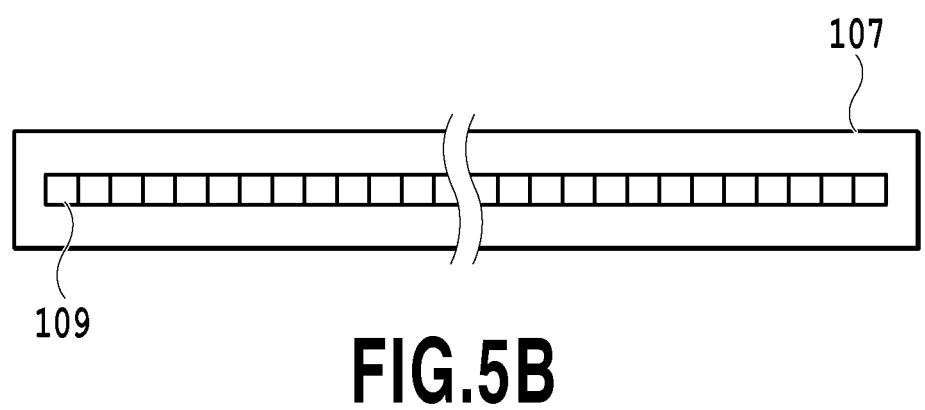

FIGS. 5A and 5B are diagrams showing the configuration of arrays of printing elements in the printing head 100 and the configuration of an array of reading elements in the reading head 107. In the printing head 100, each of the printing element arrays 101 to 104 corresponding to the respective ink colors includes printing element substrates 201, each of which includes printing elements 108 arrayed at a constant pitch. The printing element substrates 201 are arranged alternately in the Y direction so as to be continuous in the X direction while providing overlap regions D. Each of the printing elements 108 ejects ink at a constant frequency based on print data to the sheet P conveyed in the Y direction at a constant speed, thereby printing, on the sheet P, an image of resolution corresponding to the pitch of arrays of the printing elements 108. The density of the printing elements 108 in each printing element array is remarkably high and accordingly there is a high possibility that an error in manufacturing the printing head 100 causes a white stripe particularly in the overlap regions D.

In the reading head 107, reading sensors 109 are arrayed at a predetermined pitch in the X direction. Although not shown in the figure, in each of the reading sensors 109, reading elements, which may be a minimum unit of a read pixel, are arrayed in the X direction. The reading elements of each of the reading sensor 109 capture an image on the sheet P, which is conveyed in the Y direction at a constant speed, at a predetermined frequency, thereby reading the entire image printed on the sheet P at the pitch of arrays of the reading elements.

A singular portion detection algorithm in the present embodiment will be described below in detail. The singular portion detection algorithm of the present embodiment is an algorithm for capturing a printed image to obtain image data and detecting a singular portion such as a white or black stripe, which occurs at a specific position such as an overlap portion in the obtained image data, with high accuracy using a characteristic stochastic resonance process of the present invention. The present embodiment does not necessarily adopt the inkjet printing apparatus serving as the multifunction printer 6, but the following description is premised on the configuration in which an image printed by the printing head 100 of the multifunction printer 6 is read by the reading head 107 of the same multifunction printer. First, the stochastic resonance process adopted in the present embodiment will be described.

FIG. 1 is referred to again as a conceptual diagram of a process using stochastic resonance disclosed in Non-patent Literature 1. The input signal I(x) is a pixel signal value corresponding to each pixel read by the reading sensor 109 and x indicates a pixel position. The input signal I(x) is branched into M branches, to which different noises N(x, m)×K are added. m is a parameter indicating one of the M branches and is any integer ranging from 1 to M. N(x, m) is a random number corresponding to a branch m at a pixel position x and ranges from 0 to 1. A value N(x, m)×K obtained by multiplying the random number N(x, m) by the noise intensity K, which is an integer, is added to the input signal I(x). That is, on the assumption that a signal value after noise addition is i(x, m), $$i(x,m) = I(x) + N(x,m) \times K \qquad \text{(Formula 1)}$$

The signal value i(x, m) after noise addition is compared with a predetermined threshold T, thereby executing a nonlinear process (a binarization process) to obtain a binary signal j(x, m). To be more specific, $$j(x,m) = 1 \text{ Pixels where } I(x) + N(x,m) \times K \geq T$$

$$j(x,m) = 0 \text{ Pixels where } I(x) + N(x,m) \times K < T \qquad \text{(Formula 2)}$$

After that, the M signals j(x, m) are combined and averaged to obtain a signal value J after stochastic resonance. That is, $$J(x) = \frac{1}{M} \sum_{m=1}^{M} j(x, m) \qquad \text{(Formula 3)}$$

According to Non-patent Literature 1, the value of M should preferably be a larger value. As the value of M increases, the signal value J(x) approaches a value indicating a probability that the input signal value I(x) of each pixel exceeds the binarized threshold T in the nonlinear process. In other words, if a formula for obtaining the probability that the input signal value I(x) exceeds the binarized threshold T can be devised, a detection process equivalent to a number of noise addition processes and nonlinear processes shown in FIG. 1 can be executed without the need to execute these processes. Accordingly, the probability that the input signal value I(x) exceeds the binarized threshold T will be described below.

Figure 6A:
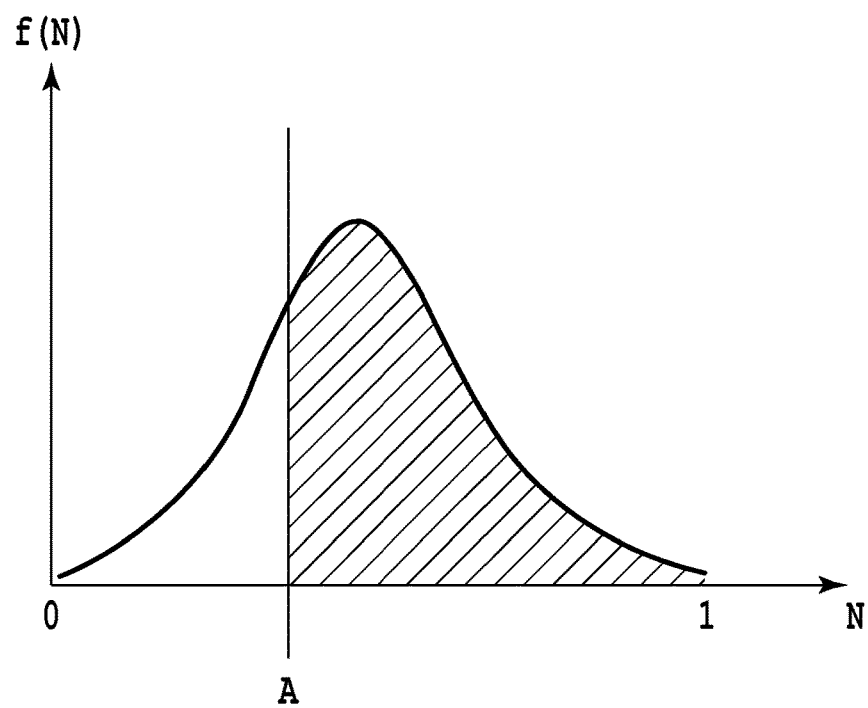
FIGS. 6A and 6B are histograms in a case where random numbers N are infinitely generated.
Figure 6B:
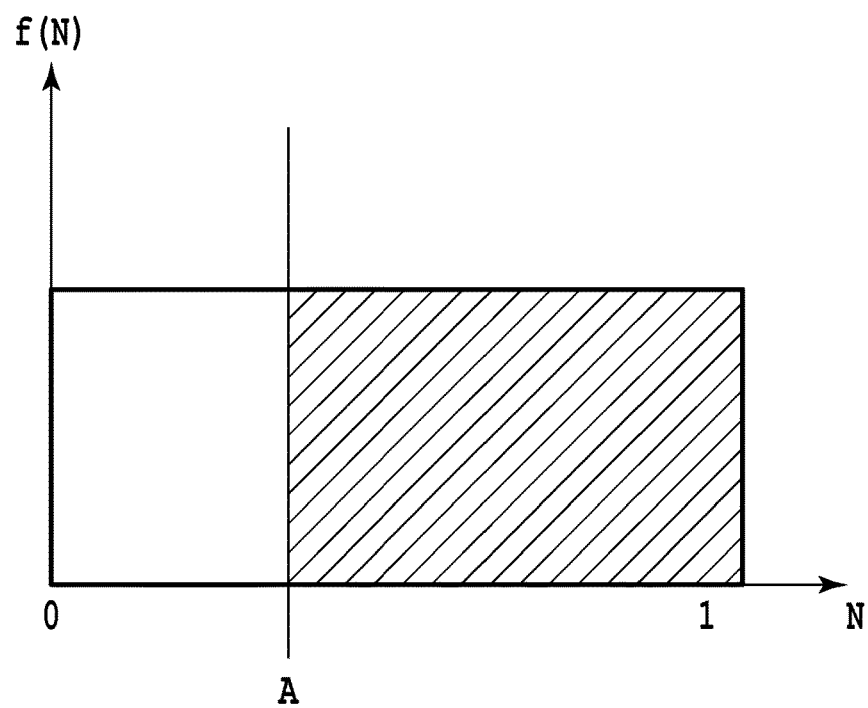

FIGS. 6A and 6B are histograms converged in a case where the random numbers N are infinitely generated. The horizontal axis represents the random numbers N and ranges from 0 to 1. The vertical axis represents a probability f (N) that each value N is generated. FIG. 6A shows a case of a normal distribution where an average is 0.5 and 3σ=1. FIG. 6B shows the case of so-called white noise, where the random numbers N are generated within the range from 0 to 1 at the same frequency. The following description is based on the assumption that the random numbers N are generated according to these distributions.

From Formula 1 and Formula 2, a probability that the result j(x, m) of binarization of each pixel=1 is equal to a probability that I(x)+N(x, m)×K≥T.

On the assumption that K (intensity) exhibits a positive value, the above formula can be expressed as follows:

$$N(x, m) \geq \frac{\{T1 - I(x)\}}{K} \quad \text{(Formula 4)}$$

If the right-hand side is expressed by A, $$N(x,m) \geq A \quad \text{(Formula 5)}$$

The probability that the result j(x, m) of binarization of each pixel becomes 1, that is, the signal value J(x) after a stochastic resonance process, is equal to a probability that the Formula 5 is satisfied. In each of FIGS. 6A and 6B, the diagonally shaded area corresponds to this probability, which is expressed as follows:

$$J(x) = \begin{cases} 1 & \text{Pixel where } A < 0 \\ 0 & \text{Pixel where } A > 1 \\ 1 - \int_{N=0}^{A2} f(N)dN & \text{Pixel where } 0 \leq A \leq 1 \end{cases} \quad \text{(Formula 6)}$$

If the histogram of generation of the random numbers N is a normal distribution as shown in FIG. 6A, Formula 6 is as follows:

$$J(x) = \begin{cases} 1 & \text{Pixel where } A < 0 \\ 0 & \text{Pixel where } A > 1 \\ 1 - \frac{1}{1 + \exp\{-\alpha(A - 0.5)\}} & \text{Pixel where } 0 \leq A \leq 1 \end{cases}$$

Further, if the histogram of the noise N is a normal distribution where ±3σ=1 as shown in FIG. 6A, a coefficient α is about 10.8. If the constant A is replaced with the original formula {T−I(x, m)}/K, $$J(x) = \quad \text{(Formula 7)}$$
$$\begin{cases} 1 & \text{Pixel where } T < I(x) \\ 0 & \text{Pixel where } I(x) > T - K \\ 1 - \frac{1}{1 + \exp\left\{-\alpha\left(\frac{\{T - I(x)\}}{K} - 0.5\right)\right\}} & \text{Pixel where } T - K \leq I(x) \leq T \end{cases}$$

On the other hand, if the histogram of generation of the random numbers N is the distribution shown in FIG. 6B, Formula 6 can be expressed as follows:

$$J(x) = \begin{cases} 1 & \text{Pixel where } A < 0 \\ 0 & \text{Pixel where } A > 1 \\ 1 - A & \text{Pixel where } 0 \leq A \leq 1 \end{cases}$$

If the constant A is replaced with the original formula {T−I(x, m)}/K, $$J(x) = \begin{cases} 1 & \text{Pixel where } T < I(x) \\ 0 & \text{Pixel where } I(x) < T - K \\ 1 - \frac{T - I(x)}{K} & \text{Pixel where } T - K \leq I(x) \leq T \end{cases} \quad \text{(Formula 8)}$$

Figure 7A:
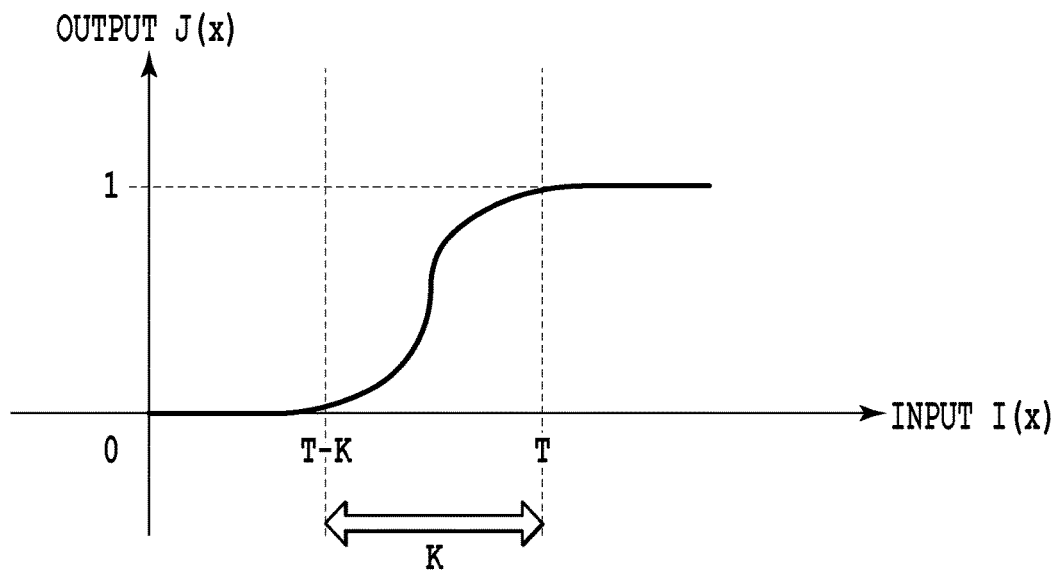
FIGS. 7A and 7B are graphs of Formula 7 and Formula 8.
Figure 7B:
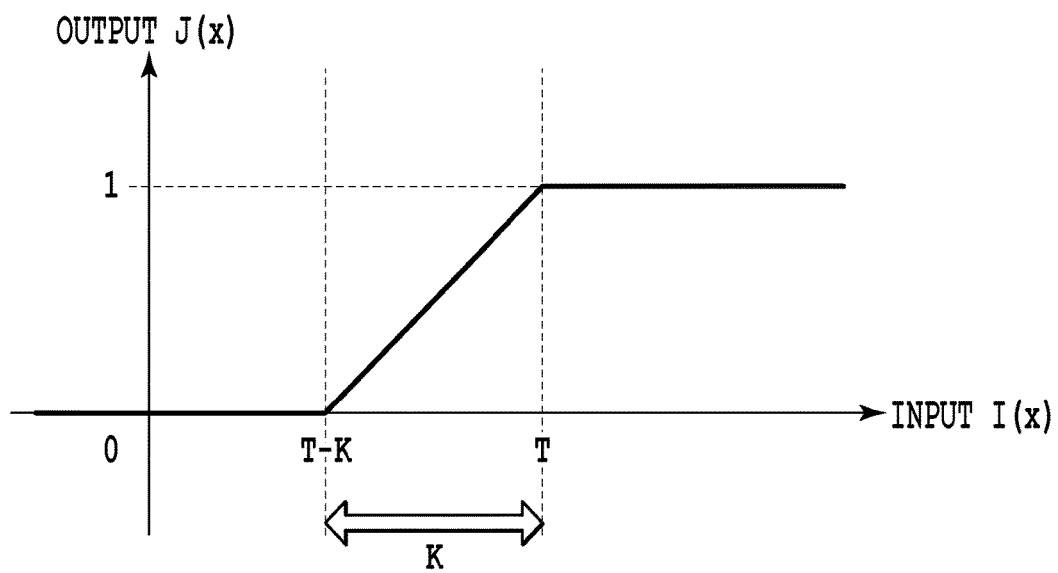

FIGS. 7A and 7B are graphs of Formula 7 and Formula 8. In either case, if Formula 7 or Formula 8 is used with a suitable noise intensity K and threshold T, a singular portion can be extracted with the same accuracy as that in a case where the number of branches M of the input signal value I(x) is infinitely increased using the method disclosed in Non-patent Literature 1.

As described in "Description of the Related Art," however, the present invention is characterized in that information on surrounding pixels is also used for determining whether a pixel position x is included in a singular portion with higher accuracy. Accordingly, in the present embodiment, after a first nonlinear process for values obtained by adding noises in a target pixel a second nonlinear process reflecting the results of the first nonlinear process of surrounding pixels is executed.

Figure 8:
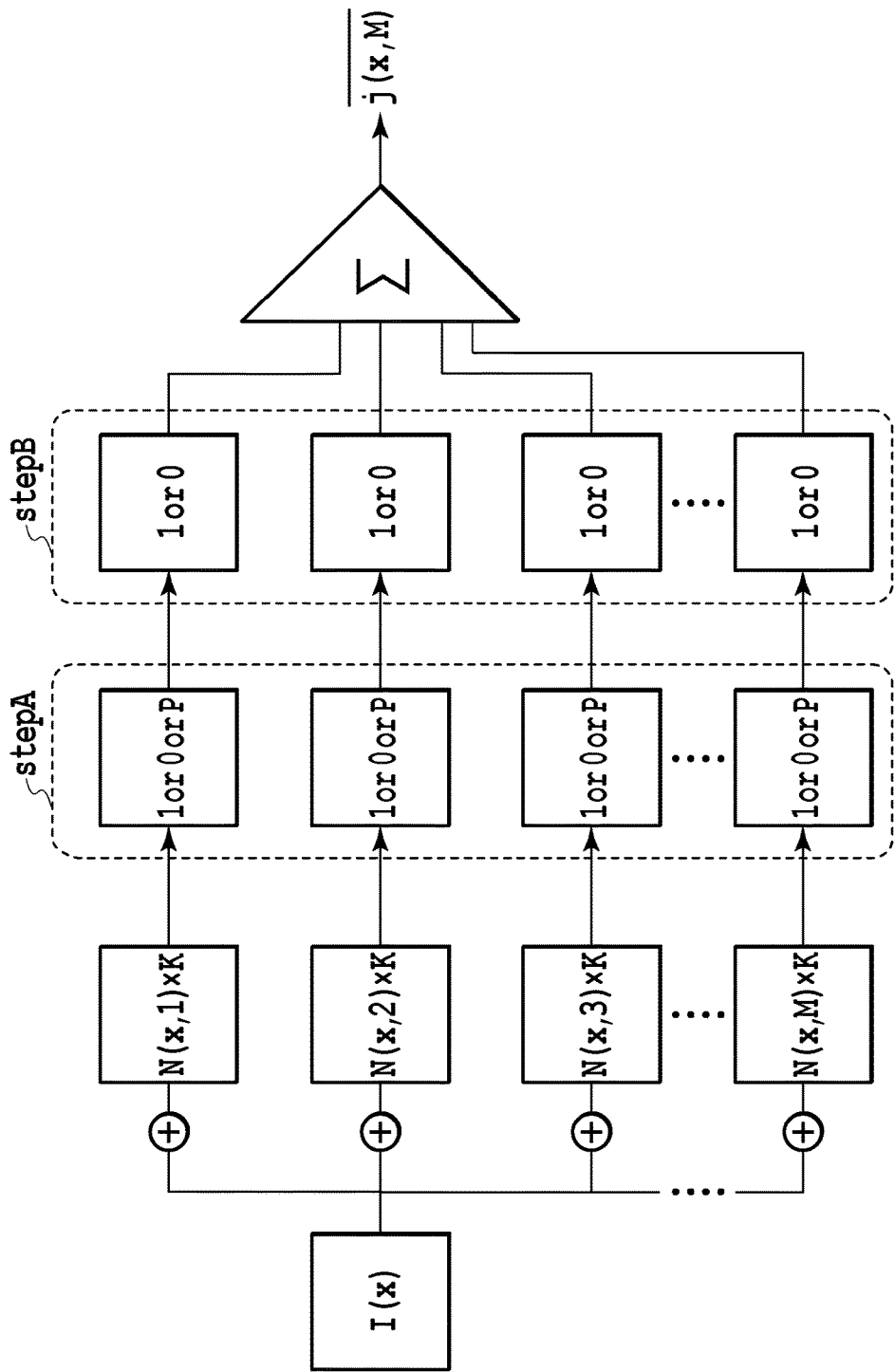
FIG. 8 is a conceptual diagram of a stochastic resonance process adopted in a first embodiment.

FIG. 8 is a conceptual diagram of a stochastic resonance process adopted in the present embodiment. In the same manner as Non-patent Literature 1 shown in FIG. 1, the input signal I(x) is divided into M branches and subjected to a parallel process. To be more specific, first, different noises N(x, m)×K are added to them. If each signal value after noise addition is represented by i(x, m), the signal value i(x, m) can be expressed by Formula 1 described above:

$$i(x,m)=I(x)+N(x,m).$$

In the present embodiment, i(x, m) is first compared with two thresholds T1<T2 in StepA to obtain a ternarized value j'(x, m) as a first nonlinear process. More specifically, $$j'(x, m) = \begin{cases} 1 & \text{Pixel where } I(x) + N(x, m) \times K > T2 \\ 0 & \text{Pixel where } I(x) + N(x, m) \times K < T1 \\ P & \text{Pixel where } T1 \leq I(x) + N(x, m) \times K \leq T2 \end{cases} \quad \text{(Formula 9)}$$

Next, in StepB, a binarization process is executed as a second nonlinear process. More specifically, the ternarized values are used as binarized values for pixels where j'(x, m)=0 or j'(x, m)=1, and a binarization process of converting "P" into "0" or "1" is executed only for pixels where j'(x, m)=P. At this time, the binarization process of converting "P" into "0" or "1" is executed based on the results of the ternarization process (first nonlinear process) for surrounding pixels.

Figure 9:
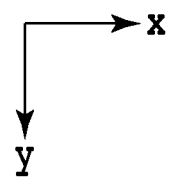
FIG. 9 is a schematic diagram showing a second nonlinear process.

FIG. 9 is a schematic diagram showing the second nonlinear process in StepB. In the present embodiment, if the result of the first nonlinear process for a target pixel x is "P", the target pixel is binarized based on the results of the first nonlinear process for eight surrounding pixels adjacent to the target pixel x in eight directions. To be more specific, if the result of the first nonlinear process is "1" in one or more of the eight pixels, it is determined that there is a high possibility that the target pixel is included in a singular portion, thereby determining that j(x, m)=1. In contrast, if the result of the first nonlinear process is "1" in none of the eight pixels, it is determined that there is a low possibility that the target pixel is included in a singular portion, thereby determining that j(x, m)=0. In the example shown in FIG. 9, the result of the first nonlinear process for a pixel located at the lower right of the target pixel is "1" and accordingly it is determined that j(x, m)=1 in the second nonlinear process for the target pixel.

Returning to FIG. 8, in the present embodiment, j(x, m) thus obtained is further combined with respect to m (=1 to M) and averaged and M is infinitely increased, thereby obtaining a signal value J(x) in the target pixel x after stochastic resonance. The value J(x) corresponds to a probability that j(x, m)=1 in an arbitrary branch m in the case of subjecting the input signal value I(x, m) to the process shown in FIG. 8.

The probability that j(x, m)=1 will be described below. First, it is assumed that a probability that the result of the first nonlinear process for i(x, m) is "1" is Rate1, a probability that it is "0" is Rate0, and a probability that it is "P" is RateP. It is also assumed that a probability that j(x, m)=1 in StepB in a case where j'(x, m)=P in the first nonlinear process is RateP1.

On the above assumptions, a probability J(x) that j(x, m)=1 in an arbitrary branch m of the target pixel x is as follows:

$$J(x) = \text{Rate1} + \text{RateP} \times \text{RateP1} \tag{Formula 10}$$

That is, J(x) can be calculated if Rate1, RateP, and RateP1 are obtained.

First, Rate1 is a probability that I(x)>T2 and therefore can be obtained by replacing T in Formula 7 and Formula 8 with T2. For instance, if the random numbers are white noise, Rate1 can be obtained using Formula 8 as follows:

$$\text{Rate1}(x) = \begin{cases} 1 & \text{Pixel where } T2 < I(x) \\ 0 & \text{Pixel where } I(x) < T2 - K \\ 1 - \dfrac{T2 - I(x)}{K} & \text{Pixel where } T2 - K \leq I(x) \leq T2 \end{cases} \tag{Formula 11}$$

Rate0 is a probability that I(x)<T1, namely, a value obtained by subtracting a probability that I(x)≥T1 from 1. Accordingly, Rate0 can be obtained by subtracting a value obtained by replacing T in Formula 7 and Formula 8 with T1 from 1. For instance, if the random numbers are white noise, Rate0 can be obtained using Formula 8 as follows:

$$\text{Rate0}(x) = \begin{cases} 0 & \text{Pixel where } T1 < I(x) \\ 1 & \text{Pixel where } I(x) < T1 - K \\ \dfrac{T1 - I(x)}{K} & \text{Pixel where } T1 - K \leq I(x) \leq T1 \end{cases} \tag{Formula 12}$$

As expressed by Formula 9, RateP is a probability that T1≤I(x)+N(x,m)×K≤T2. If I(x) is subtracted from all the sides of this formula and they are then divided by the intensity K (≠0), $$\frac{T1 - I(x)}{K} \leq N(x, m) \leq \frac{T2 - I(x)}{K}$$

If the left-hand side is expressed by A1 and the right-hand side is expressed by A2, $$A1 \leq N(x,m) \leq A2 \tag{Formula 13}$$

Figure 10A:
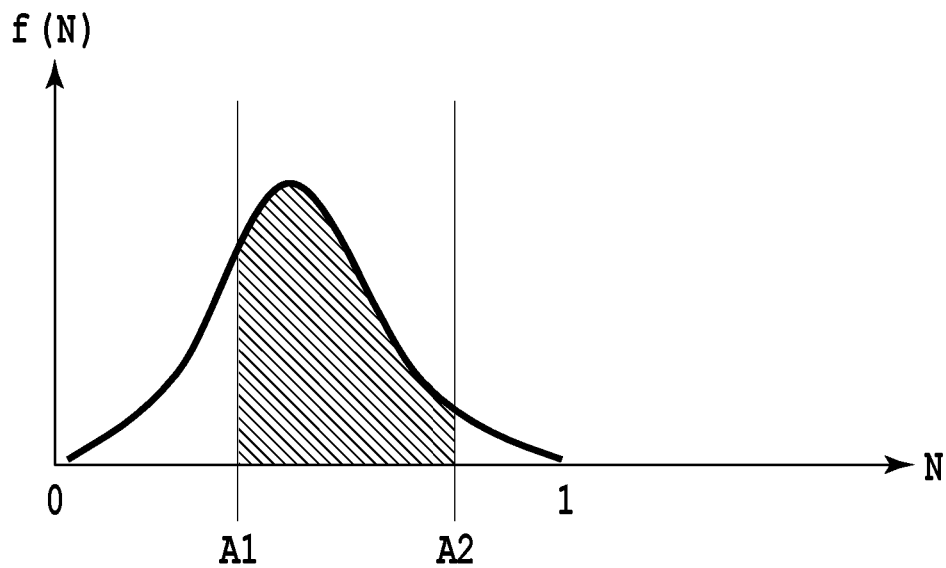
FIGS. 10A and 10B are histograms showing a probability that Formula 13 is satisfied.
Figure 10B:
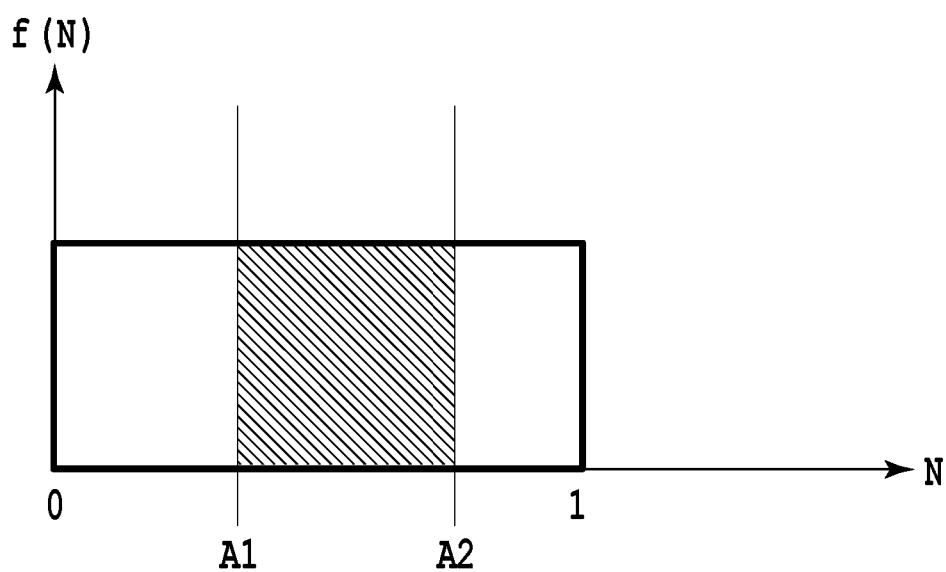

In FIGS. 10A and 10B, the same histograms as FIGS. 6A and 6B are used to show a probability that Formula 13 is satisfied. The diagonally shaded areas correspond to the probability, which is expressed as Formula 14 below:

(if $A2 - A1 > 1$)

$$\text{RateP}(x) = \begin{cases} 0 & \text{Pixel where } A1 < 0 \\ 1 - \int_{N=0}^{A2} f(N)\,dN & \text{Pixel where } 0 \leq A2 \leq 1 \text{ and } A1 < 0 \\ 1 & \text{Pixel where } 1 < A2 \text{ and } A1 < 0 \\ 1 - \int_{N=A1}^{1} f(N)\,dN & \text{Pixel where } 1 \leq A2 \text{ and } 0 \leq A1 \leq 1 \\ 0 & \text{Pixel where } A1 > 1 \end{cases} \tag{Formula 14}$$

(if $A2 - A1 \leq 1$)

$$\text{RateP}(x) = \begin{cases} 0 & \text{Pixel where } A2 < 0 \\ 1 - \int_{N=0}^{A2} f(N)\,dN & \text{Pixel where } 0 \leq A2 \leq 1 \text{ and } A1 < 0 \\ \int_{N=A1}^{A2} f(N)\,dN & \text{Pixel where } 0 < A1 \text{ and } A2 < 1 \\ 1 - \int_{N=A1}^{1} f(N)\,dN & \text{Pixel where } 1 \leq A2 \text{ and } 0 \leq A1 \leq 1 \\ 0 & \text{Pixel where } A1 > 1 \end{cases} \tag{Formula 15}$$

If the histogram of generation of the random numbers N is white noise as shown in FIG. 6B, Formulas 14 and 15 become Formulas 16 and 17 as follows:

(if $T2 - T1 > K$)

$$\text{RateP}(x) = \begin{cases} 0 & \text{Pixel where } T2 < I(x) \\ \dfrac{T2 - I(x)}{K} & \text{Pixel where } T2 - K \leq I(x) \leq T2 \\ 1 & \text{Pixel where } T1 \leq I(x) \leq T2 - K \\ 1 - \dfrac{T2 - I(x)}{K} & \text{Pixel where } T1 - K \leq I(x) \leq T1 \\ 0 & \text{Pixel where } I(x) < T1 - K \end{cases} \tag{Formula 16}$$

(if $T2 - T1 > K$)

-continued $$RateP(x) = \begin{cases} 0 & \text{Pixel where } T2 < I(x) \\ \dfrac{T2 - I(x)}{K} & \text{Pixel where } T1 \le I(x) \le T2 \\ \dfrac{T2 - T1}{K} & \text{Pixel where } T2 - K \le I(x) \le T1 \\ 1 - \dfrac{T1 - I(x)}{K} & \text{Pixel where } T1 - K \le I(x) \le T2 - K \\ 0 & \text{Pixel where } I(x) < T1 - K \end{cases} \quad \text{(Formula 17)}$$

RateP can also be obtained by subtracting Rate0 and Rate1 from 1 using Formula 11 and Formula 12:

$$RateP = 1 - (Rate1 + Rate0)$$

Figure 11A:
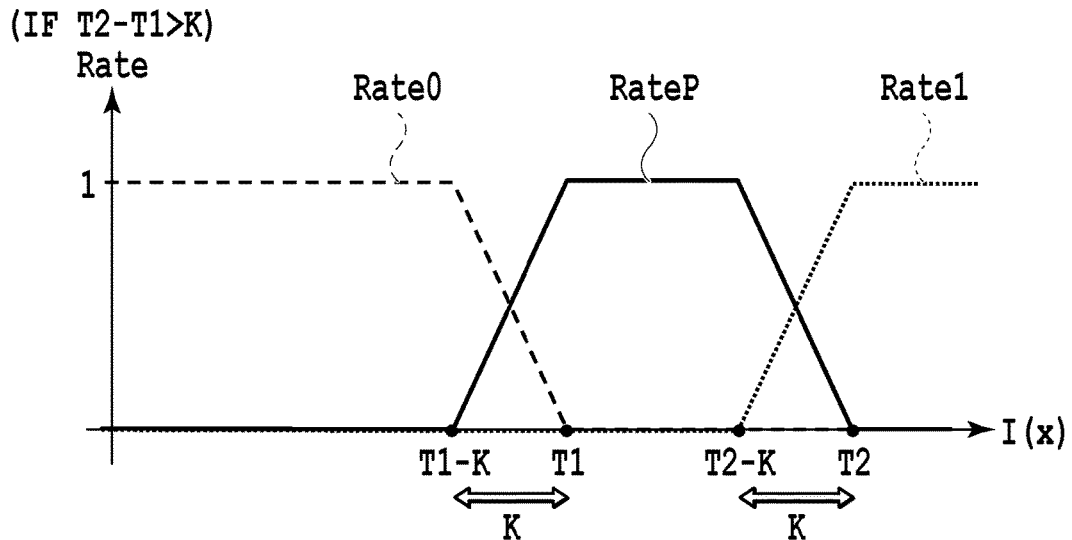
FIGS. 11A and 11B are correlation diagrams of Rate1, Rate0, and RateP.
Figure 11B:
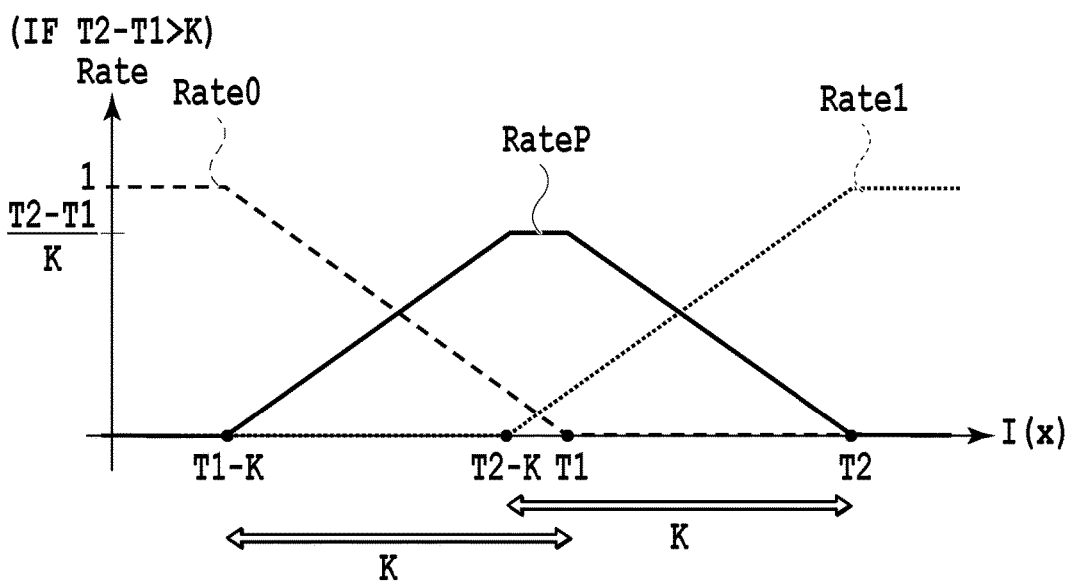

FIGS. 11A and 11B are graphs of the above-described probabilities Rate1, Rate0, and RateP. FIG. 11A is a graph showing a case where T2−T1>K based on Formulas 11, 12, and 16. FIG. 11B is a graph showing a case where T2−T1<K using Formulas 11, 12, and 17. In either graph, the horizontal axis represents the input signal value I(x) and the vertical axis represents the probability.

RateP1, namely, a probability that j(x, m)=1 in StepB in the target pixel x where j'(x, m)=P in StepA is a probability that j'(x, m) is determined to be "1" in StepA in one or more of the eight pixels adjacent to the target pixel x. This probability is equal to "a value obtained by subtracting a probability that the ternarized value is '0' or 'P' in all the eight pixels from 1". The "probability that the ternarized value is '0' or 'P' in all the eight pixels" can be obtained as the mathematical product of probabilities for the eight pixels, each of which is a probability that the ternarized value is "0" or "P" in each pixel.

As described above, each of Rate1, Rate0, RateP, and RateP1 in an arbitrary branch circuit m of the target pixel x can be calculated from the input signal value I(x), the two thresholds T1 and T2, and the noise intensity K. As a result, a probability that j(x, m)=1 in an arbitrary branch circuit m of the target pixel x, that is, the result J(x) of the stochastic resonance process for the target pixel x can be calculated based on Formula 10.

Figure 12:
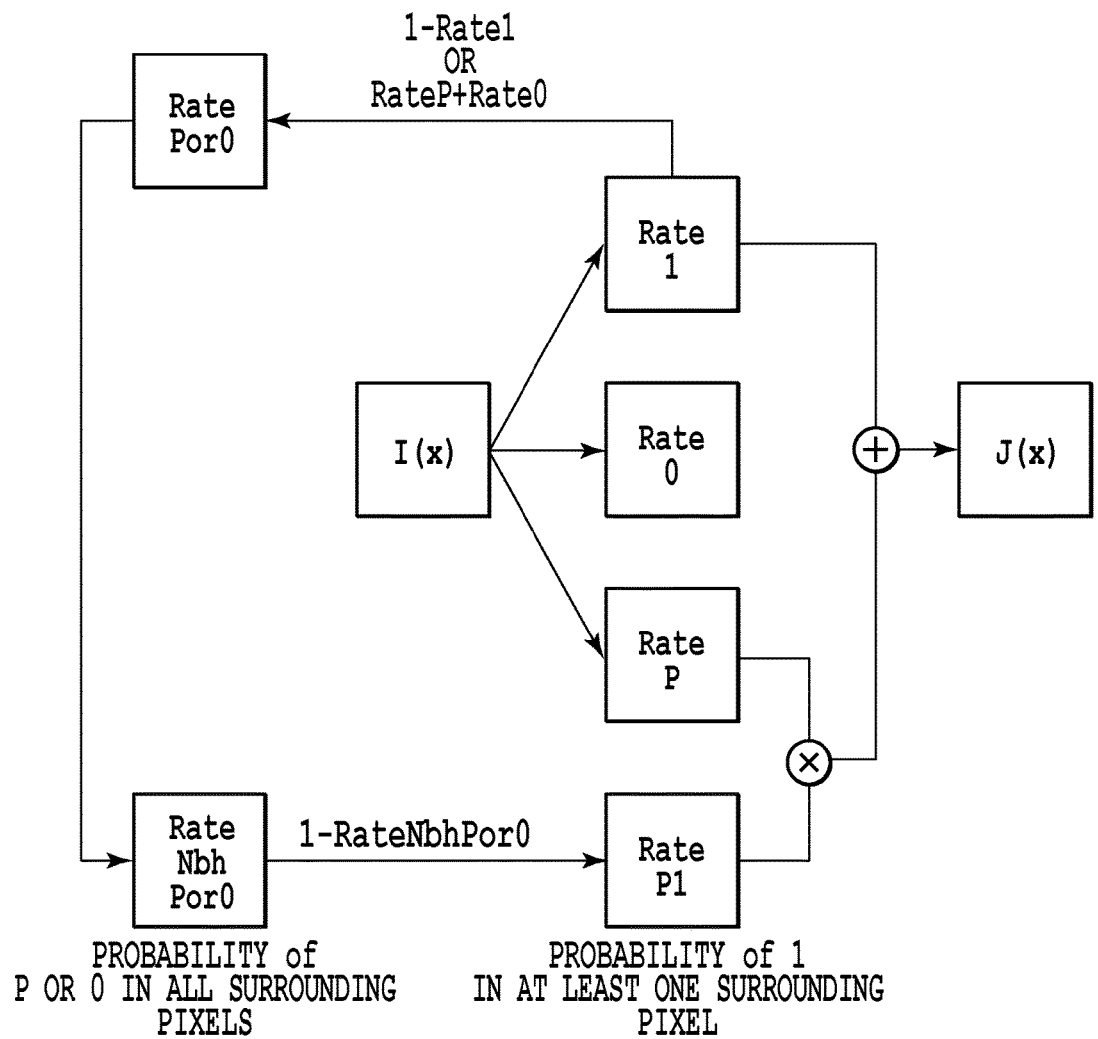
FIG. 12 is a conceptual diagram for calculating J(x)

FIG. 12 is a conceptual diagram for calculating J(x). For each of the pixels, Rate1, Rate0, and RateP are calculated based on Formulas 11, 12, and 14, respectively. Further, Rate1, Rate0, and RateP are used to obtain RatePor0, or a "probability that the result of the first nonlinear process is 'P' or '0.'" At this time, RatePor0 may be obtained by adding Rate0 to RateP or subtracting Rate1 from 1. That is, RatePor0=Rate0+RateP or RatePor0=1−Rate1.

Regarding the target pixel x, RateNbhPor0, or a "probability that the ternarized value is '0' or 'P' in all the eight pixels" is calculated by mathematical producing RatePor0 for the eight pixels around the target pixel x. Further, RateP1 of the target pixel, or a possibility that the binarized value is 1 in StepB is calculated by subtracting RateNbhPor0 from 1:

$$RateP1 = 1 - RateNbhPor0$$

As a result, Rate1, RateP, and RateP1 in the target pixel are obtained. J(x) can be obtained by adding the mathematical product of RateP and RateP1 to Rate1 based on Formula 10.

The above-described method of calculating J(x) corresponds to a form in which information on surrounding pixels is further used in a case where the number of branches M of the input signal value I(x) is infinitely increased in Non-patent Literature 1. Accordingly, it is expected that whether a target pixel is located at a singular portion can be determined with higher accuracy than that in a case where the number of branches M of the input signal value I(x) is infinitely increased in Non-patent Literature 1. That is, according to the present embodiment, a singular portion in an image can be extracted with high accuracy using stochastic resonance in a relatively simple process.

Specific examples of using the stochastic resonance process of the above-described present embodiment will be described below. The present embodiment aims to detect a white stripe in an overlap portion D in the inkjet printing apparatus described with reference to FIGS. 4 and 5 if it exists. The white stripe is detected by printing a uniform image by the printing head 100 and reading the printed image by the reading head 107. That is, the white stripe is a target of detection.

Figures 13A, 13B, 13C:
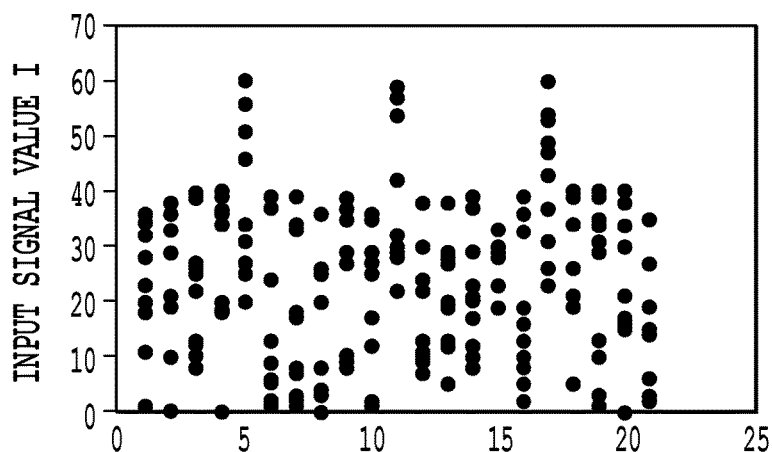
FIGS. 13A to 13C are diagrams showing detection target data and read data.

FIGS. 13A to 13C are diagrams showing detection target data in a case where white stripes are generated at a predetermined position, a result of reading an actual image including the white stripes at the predetermined position by the reading head 107, and a result of reading each pixel associated with a position in the X direction. FIG. 13A shows two-dimensionally arranged pixels, where white pixels indicate pixels corresponding to the white stripes and diagonally shaded pixels indicate pixels not corresponding to the white stripes.

FIG. 13B shows input data (hereinafter referred to as read data) obtained as a result of reading an image by the reading head 107. In FIG. 13B, a result of quantizing an analog signal obtained by each reading element to 8 bits (256 levels) is shown as a brightness value. As the brightness value increases, a possibility that the image has high lightness, namely a possibility of a white stripe becomes higher.

FIG. 13C is a graph plotted by associating the brightness value of each pixel with a position in the X direction. In FIG. 13C, the brightness values of the pixels at the positions of the white stripes are relatively higher than those in different areas. FIG. 13C shows that the brightness value of the pixel at the position of the white stripe is 20 and is buried in noise intensity of 40. In order to extract the white stripes with high accuracy in the present embodiment, it is necessary to execute a predetermined stochastic resonance process for raw read data as shown in FIG. 13B to obtain a result as similar to the detection target data shown in FIG. 13A as possible.

Figures 14A, 14B, 14C:
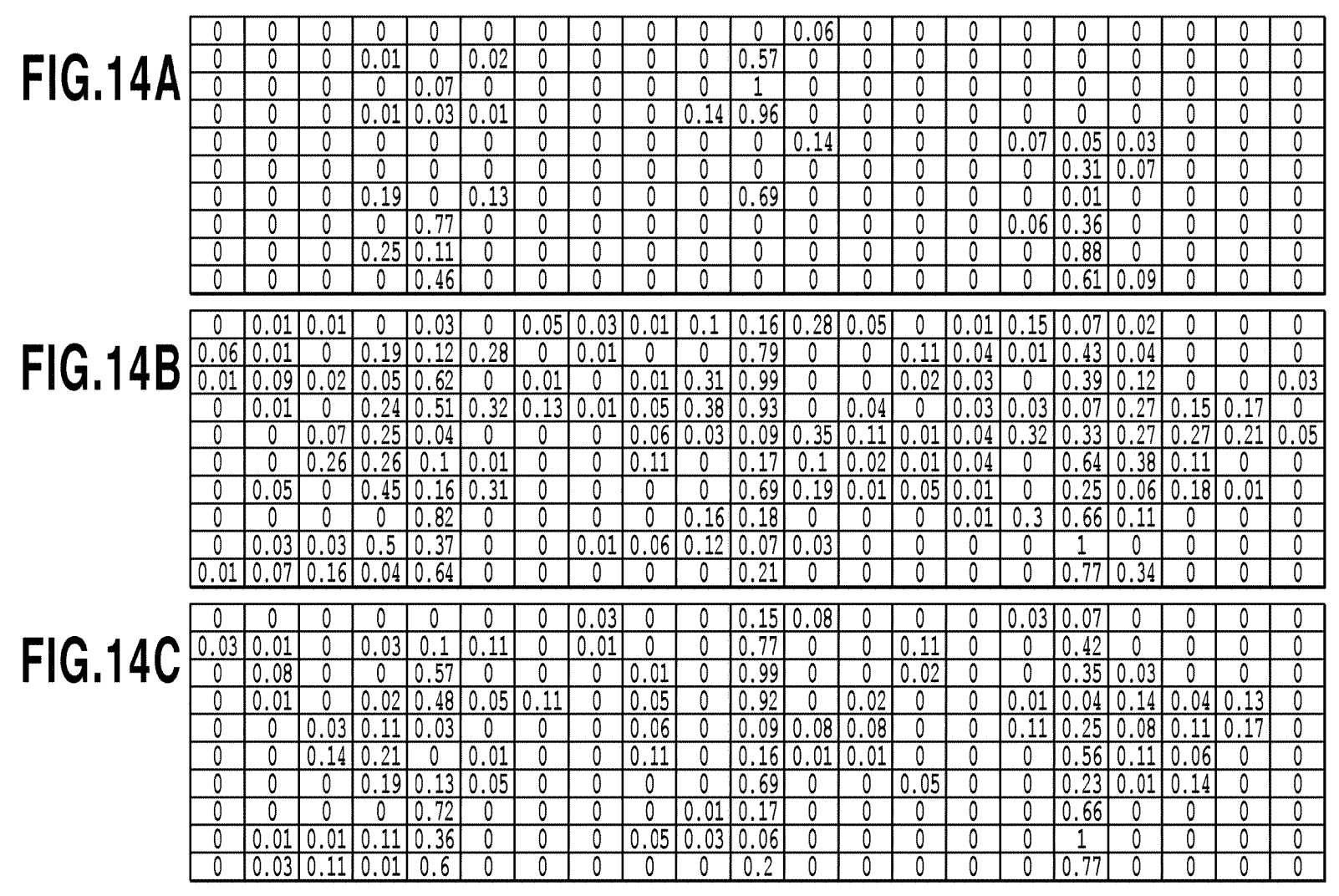

FIGS. 14A and 14B show a result J(x) of subjecting the data shown in FIG. 13B to a stochastic resonance process premised on white noise as expressed by Formulas 10, 11, 12, 16, and 17. FIG. 14A shows a case where the noise intensity K=40, the threshold T2=90 and the threshold T1=70. FIG. 14B shows a case where the two thresholds T1 and T2 are equal to those in the case of FIG. 14A but the noise intensity K=55. The magnitude relationship of J(x) and the distribution in an XY plane are different for FIGS. 14A and 14B. In other words, a correlation between the result of the stochastic resonance process and the detection target data in the present embodiment depends on the noise intensity K.

A correlation coefficient C that indicates the degree of correlation with the detection target data in the entire image is defined below. In the present embodiment, the correlation coefficient C is an evaluation value of detection performance indicating the degree of correlation between the detection target data shown in FIG. 13A and the result of the stochastic resonance process shown in FIGS. 14A and 14B, and can be expressed by Formula 18 below:

$$C = \frac{\sum_{x=1}^{L}(t(x)-\bar{t})(J(x)-\bar{j})}{\sqrt{\sum_{x=1}^{L}(t(x)-\bar{t})^2}\sqrt{\sum_{i=1}^{L}(J(x)-\bar{j})^2}}$$ (Formula 18)

where L corresponds to the number of pixels. In this example, L=210. t(x) represents the detection target signal shown in FIG. 13A, J(x) represents a signal after a predetermined stochastic resonance process, $\bar{t}$ represents the arithmetic mean of t(x), and $\bar{j}$ represents the arithmetic mean of J(x). The correlation coefficient C is an evaluation value that approaches 1 as a correlation between two signal groups to be compared becomes higher, and approaches 0 as the correlation becomes lower. That is, as the correlation coefficient C approaches 1, the output signal J(x) after a stochastic resonance process is closer to the detection target signal t(x) in the entire image.

Figure 15A:
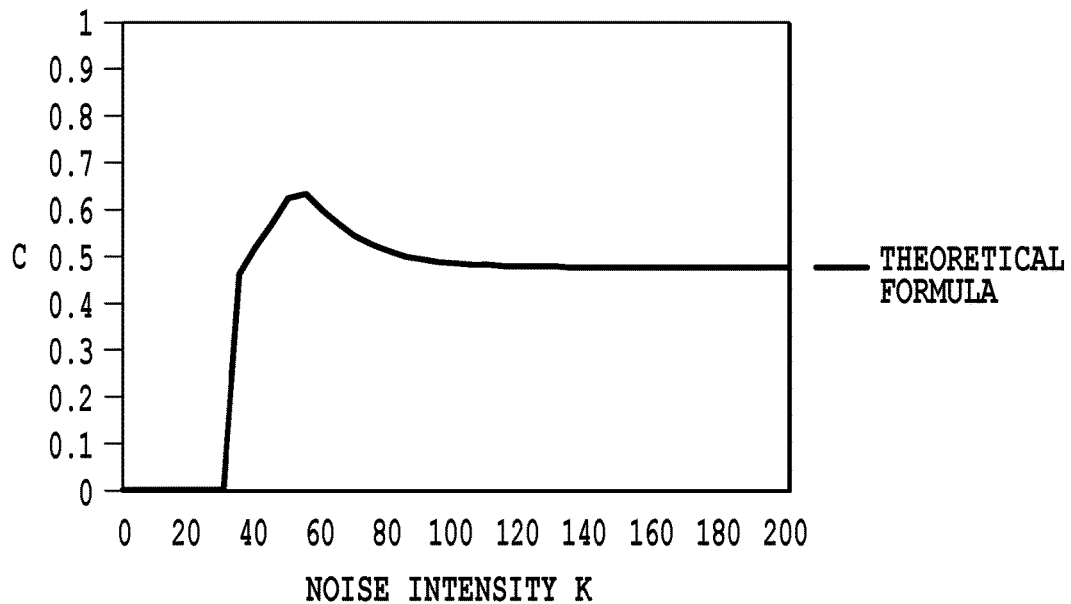
FIGS. 15A and 15B are graphs showing a relationship between a correlation coefficient C and a noise intensity K.
Figure 15B:
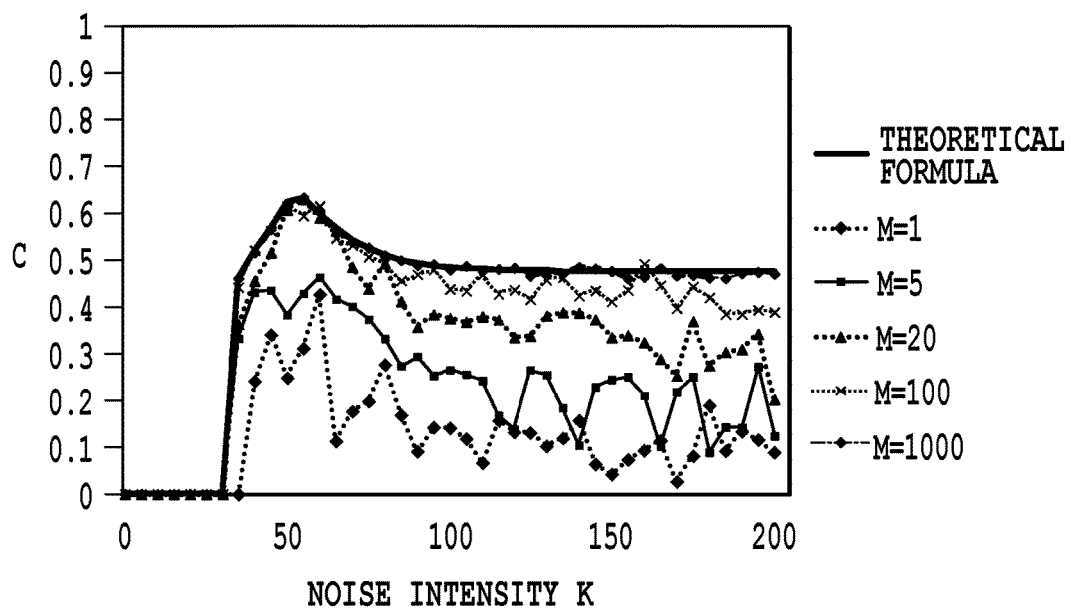

FIGS. 15A and 15B are graphs showing the correlation coefficient C in the case of changing the noise intensity K between 0 and 200 while fixing the thresholds T1 and T2 to 70 and 90, respectively. FIG. 15A shows theoretical values according to Formulas 10, 11, 12, 16, and 17. FIG. 15B shows the case of variously changing the number of branches M of a parallel process in the result shown in FIG. 14B.

In FIG. 15A, the correlation coefficient C exceeds 0 as the noise intensity K exceeds 30, reaches its peak value when K=55, decreases as K exceeds 55, and then becomes stable. In short, FIG. 15A shows the existence of a noise intensity K suitable for obtaining the highest correlation.

FIG. 15B shows that the correlation coefficient C approaches the theoretical values as the number of branches M of a parallel process increases (that is, as M approaches infinity). The use of Formulas 10, 11, 12, 16, and 17 makes it possible to easily obtain the result of the stochastic resonance process in a case where M is infinity.

Figure 16:
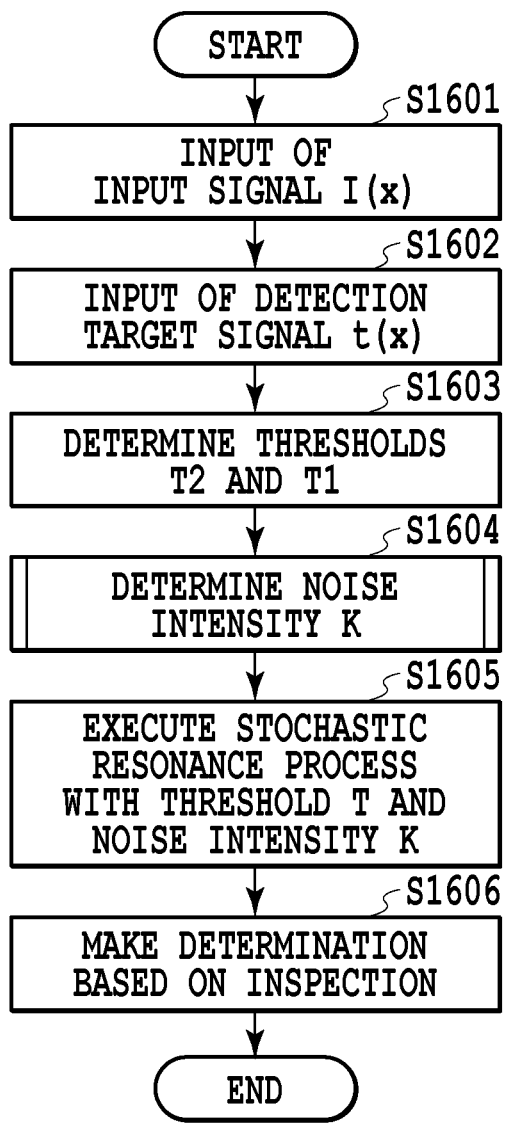
FIG. 16 is a flowchart of a singular portion detection algorithm.

FIG. 16 is a flowchart showing a process executed by the CPU 301 of the image processor 1 in a singular portion detection algorithm of the present embodiment. If the process is started, the CPU 301 first acquires read data I(x) as shown in FIG. 13B in step S1601. More specifically, the CPU 301 causes the reading head 107 to read an image printed by the printing head 100 via the scanner controller 307 and acquires I(x) as a brightness value associated with each pixel. In this case, x represents a pixel position.

In step S1602, the CPU 301 acquires the detection target data t(x) shown in FIG. 13A. The detection target data is prepared for each type of target to be extracted (such as a white stripe or density unevenness). The detection target data may be prestored in the HDD 303 or externally acquired as necessary.

In step S1603, the CPU 301 determines the thresholds T1 and T2. The thresholds T1 and T2 are set such that T1<T2 and T1 and T2 are greater than a maximum signal value SigMax, which is the largest read data shown in FIG. 13B among the pixel positions x having a signal value of "1" in the detection target data shown in FIG. 13A. In FIG. 13B, the brightness value "60" at a pixel position that is fifth from the left and third from the bottom and a pixel position that is 17th from the left and second from the bottom is the maximum signal value SigMax. For instance, the two thresholds are T2=90 and T1=70, which are greater than the maximum signal value SigMax=60.

At this time, the threshold T1 is set at such a value that if a brightness signal after noise addition is greater than the threshold T1, it is possible to determine that the pixel position is clearly located at a singular portion (a white stripe). On the other hand, the threshold T2 is set at such a value that if a brightness signal after noise addition is greater than the threshold T2, the pixel position is possibly, but not certainly, located at a singular portion (a white stripe).

In step S1604, the CPU 301 sets an optimal noise intensity K. More specifically, the CPU 301 sets, as the optimal noise intensity K, such a noise intensity K that if the correlation coefficient C represented by Formula 18 is differentiated by the noise intensity K, the derivative is zero. This is because FIGS. 15A and 15B shows that the correlation coefficient C has a maximal and maximum value when the derivative is zero, which will be described below in detail.

Figure 17:
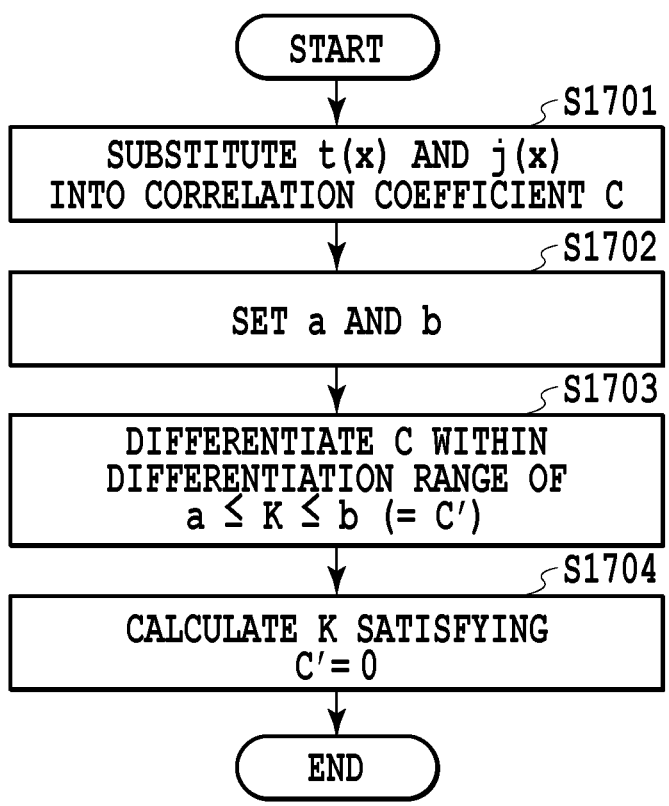
FIG. 17 is a flowchart of a process in an intensity setting step.

FIG. 17 is a flowchart of a process executed by the CPU 301 in step S1604, or the noise intensity setting step. If the process is started, in step S1701, the CPU 301 inputs the detection target signal t(x) shown in FIG. 13A to Formula 18 indicating the correlation coefficient C and substitutes Formulas 10, 11, 12, 16, and 17 for J(x), thereby making the correlation coefficient C into a function of only the noise intensity K. In step S1702, the CPU 301 sets the range of a≤K≤b, in which the function C(K) obtained in step S1701 is differentiated.

Figure 18A:
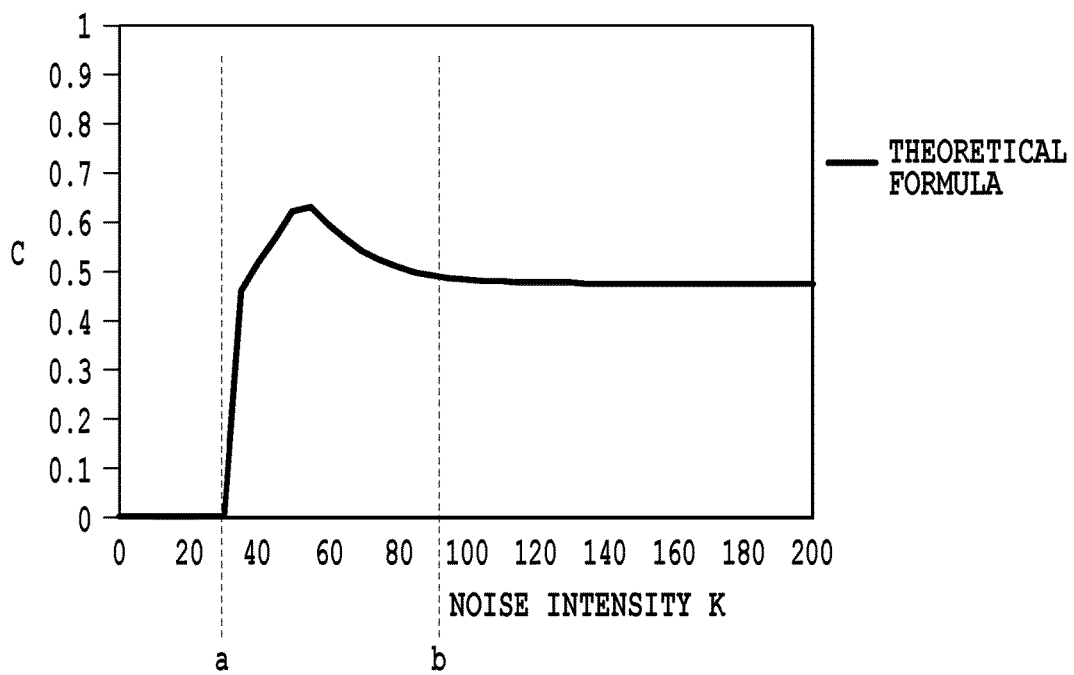
FIGS. 18A and 18B are graphs showing settable ranges of the noise intensity K.

FIG. 18A shows the differentiation range a K≤K≤b. The correlation coefficient C(K)=0 if K is less than or equal to a given value but C(K)>0 if K exceeds the value. According to Formula 11, such a value of K to be a boundary is a boundary value between K that makes all the pixels x satisfy T2>I(x)+K and K that makes at least one pixel satisfy T≤I(x)+K. In other words, the value is a boundary between a case where all the pixels apply to the second condition in Formula 11 and a case where at least one pixel satisfies the third condition in Formula 11. This value of K can be expressed as T2−SigMax using the maximum signal value SigMax of I(x) among all the pixels. In the present embodiment, this value of K is set as the lower limit of differentiation, that is, a=T2−SigMax.

On the other hand, the correlation coefficient C(K) converges and exhibits a constant value as K is greater than a given value. According to Formula 11, such a value of K of convergence corresponds to a case where all the pixels x satisfy T2<I(x)+K, that is, a case where all the pixels apply to the first or third condition in Formula and even the minimum value of the input signal I(x) exceeds T2. This value of K can be expressed as T2−SigMin using a minimum signal value SigMin of I(x) among all the pixels. In the present embodiment, this value of K is set as the upper limit of differentiation, that is, b=T−SigMin. In this example, T2=90, SigMax=60, and SigMin=0. As a result, a=30 and b=90. The function C(K) has a single maximal value within the range of a≤K≤b.

Figure 19:
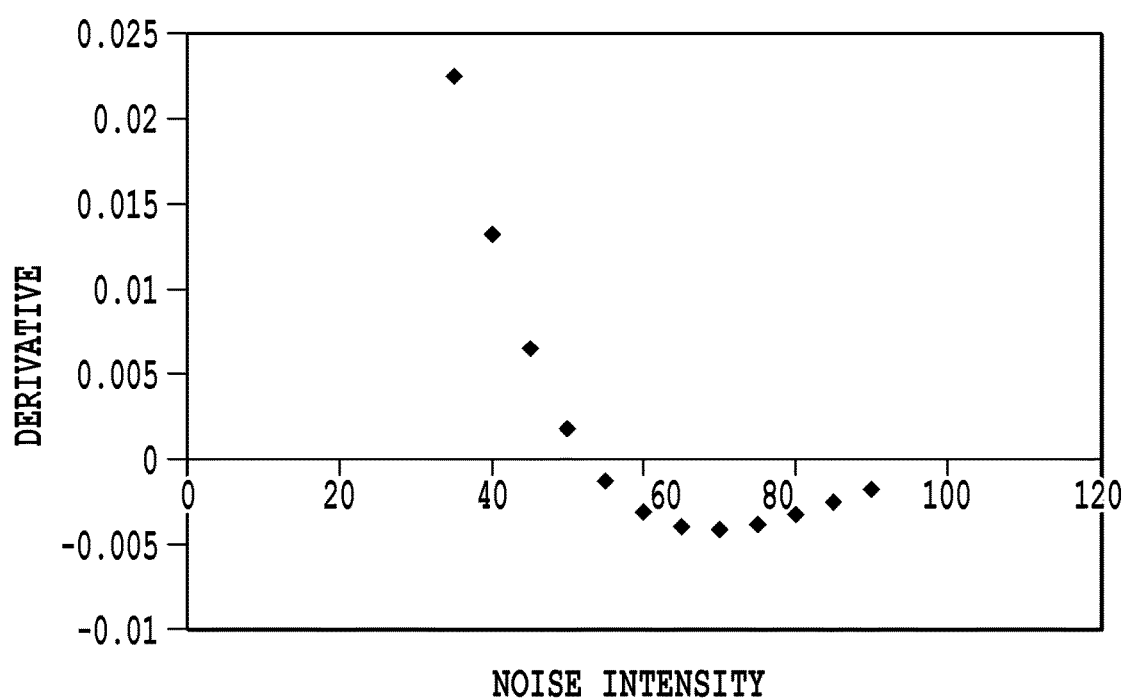
FIG. 19 is a graph of a derivative of the correlation coefficient.

Next, in step S1703, the CPU 301 differentiates the correlation coefficient C(K) obtained in step S1701 with the noise intensity K within the range of a≤K≤b. FIG. 19 is a graph of the differential value C'(K) of the correlation coefficient C(K) within the range of a≤K≤b. FIG. 19 shows that the differential value is changed from a positive value to a negative value near K=55 and C(K) exhibits the maximal value at this position. The CPU 301 obtains K that satisfies C'(K)=0 and sets it as the optimal noise intensity K=55. The process is thus finished.

Returning to the flowchart of FIG. 16, when the optimal noise intensity is set in step S1604, the CPU 301 proceeds to step S1605 and executes a predetermined stochastic resonance process. More specifically, the CPU 301 substitutes the set thresholds T1 and T2, the set noise intensity K, and the read data I(x) acquired in step S1601 into Formulas 10, 11, 12, 16, and 17 to obtain J(x) for each pixel.

FIG. 14B shows J(x) calculated for the read data I(x) shown in FIG. 13B based on Formulas 10, 11, 12, 16, and 17, where T2=90, T1=70, and the noise intensity K=55. In FIG. 14B, a result closer to the detection target data t(x) shown in FIG. 13A can be obtained compared to the case of FIG. 14A where T2=90, T1=70, and K=40.

In step S1606, the CPU 301 makes a determination based on the result of executing the stochastic resonance process under a suitable condition in step S1605. More specifically, the CPU 301 may notify a tester of a pixel from which a value greater than or equal to a predetermined pixel value is obtained by a popup window. Alternatively, the CPU 301 may determine that the inspection target image is defective if the number of pixels from which a value greater than or equal to a predetermined pixel value is obtained is greater than or equal to a predetermined number. The process is thus finished.

The detection result thus obtained may be stored as information unique to the printing apparatus and used for subsequent printing control. For instance, if a position where the white stripe is generated is stored in the ROM 313 of the multifunction printer 6 to make the number of ejection operations of a printing element located near the position of the white stripe greater than usual at the time of actual printing operation a white stripe in an image can be inconspicuous.

According to the present embodiment described above, the presence or absence of a singular portion such as a white stripe generated at a specific position can be determined with high accuracy. For example, even if the flowchart shown in FIG. 16 is executed for an image not including a white stripe, optimal thresholds T1 and T2 and an optimal noise intensity K are set in step S1603 and step S1604. In this case, however, the correlation with the detection target data t(x) is low and a result in which values greater than or equal to a predetermined pixel value are distributed at specific positions as shown in FIGS. 14A and 14B is not obtained. Accordingly, a tester can determine that no white stripe is generated from the state of a popup image in step S1606. Alternatively, the CPU 301 can determine that no white stripe is generated from the fact that the number of pixels having a value greater than or equal to a predetermined pixel value is less than a predetermined number.

In the above description, the noise intensity K at which C(K) exhibits a maximal value is set as the noise intensity K for the stochastic resonance process executed in step S1605. However, the noise intensity K at which C(K) exhibits a maximal value need not necessarily be used to improve the detection accuracy. More specifically, it can be said that the detection accuracy is improved compared to a case not executing the stochastic resonance process provided that it is possible to obtain a correlation coefficient C having a value greater than that of an initial correlation coefficient C of read data I(x) with detection target data t(x). For example, in the case of the read data shown in FIG. 13B, the correlation coefficient C with the detection target data of FIG. 13A is 0.47. Accordingly, it is only necessary to execute such a stochastic resonance process that a correlation coefficient C greater than 0.47 can be obtained.

As described above, for example, when FIG. 14A and FIG. 14B are compared with each other, the correlation of FIG. 14B with the detection target data shown in FIG. 13A is higher than that of FIG. 14A and therefore detection can be executed with high accuracy in the case of FIG. 14B. However, even in the case of FIG. 14A where the noise intensity K=40, the correlation coefficient C is 0.52, which is greater than the correlation coefficient (C=0.47) in the case of not executing the stochastic resonance process. Accordingly, the advantageous result of the stochastic resonance process can be achieved.

Figure 18B:
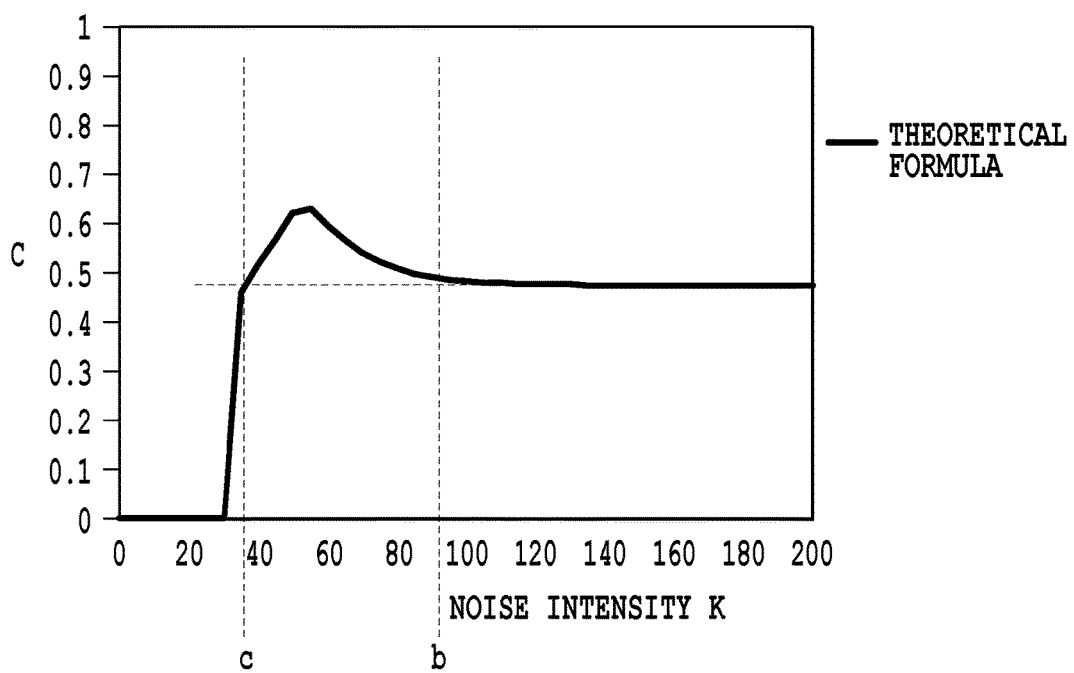

FIG. 18B is a graph showing the range of the noise intensity K in which the correlation coefficient C described above can be obtained. If the noise intensity K exceeds b, the advantageous result of the stochastic resonance process cannot be achieved and the correlation coefficient C is equal to the initial correlation coefficient C (=0.47) of the read data I(x) with the detection target data t(x). In other words, the noise intensity K should be less than b in order to achieve the advantageous result of the stochastic resonance process. Incidentally, since the correlation coefficient C has a single maximal value within the range of 0<K<b, another K that satisfies C(K)=0.47 exists within the range of K≤b. This is defined as c (C(b)=C(c)=0.47). That is, the correlation coefficient and the detection accuracy can be improved compared to the case of not executing the stochastic resonance process if K that satisfies c<K<b is set as the noise intensity K and the stochastic resonance process described above is executed.

In an inspection system, however, it is preferable that the noise intensity K is set at a value greater than a value at which C'(K)=0 (in this example, K=55) even within the above range. This is because, in the case of the inspection system, the state of "undetected" where a pixel that is possibly a singular portion cannot be extracted is fatal and it is therefore important to bring about the state of "over-detection" where many normal pixels are extracted as a singular portion. If the noise intensity K is set within the range of 55≤K≤b and a probability that the result of binarization is 1 is increased in each pixel, the state of "undetected" can be actively avoided compared to a case where the noise intensity K is set within the range of c≤K≤55.

The above description uses a white stripe as an example, but as described above, the present embodiment can also detect a singular portion having other features. In this case, it is only necessary to prepare detection target data t(x) for each type of singular portion to be extracted (such as a white stripe or density unevenness). At this time, it is preferable that the extent of reflection of the results of the first nonlinear process for surrounding pixels on the second nonlinear process, that is, the probability RateP1 is adjusted according to the type of singular portion. Further, the flowchart shown in FIG. 16 may be repeated while changing the detection target data t(x) in order to detect singular portions having different features such as a white stripe and density unevenness. In the case of continuously inspecting test patterns printed on the same type of print medium using different printing heads based on the same print data, the optimal thresholds T1 and T2 and noise intensity K may be shared among the test patterns. In this case, for instance, it is only necessary to temporarily store the thresholds T1 and T2 and noise intensity K obtained in steps S1603 and S1604 for the first test pattern and omit steps S1603 and S1604 for the subsequent test patterns. The inspection step for the same type of singular portion can be thus reduced.

According to the present embodiment described above, the stochastic resonance process can be executed while setting a noise intensity effective to detection target data without preparing a number of nonlinear circuits. As a result, a target singular portion can be detected with high accuracy and efficiency.

Second Embodiment

Figure 20:
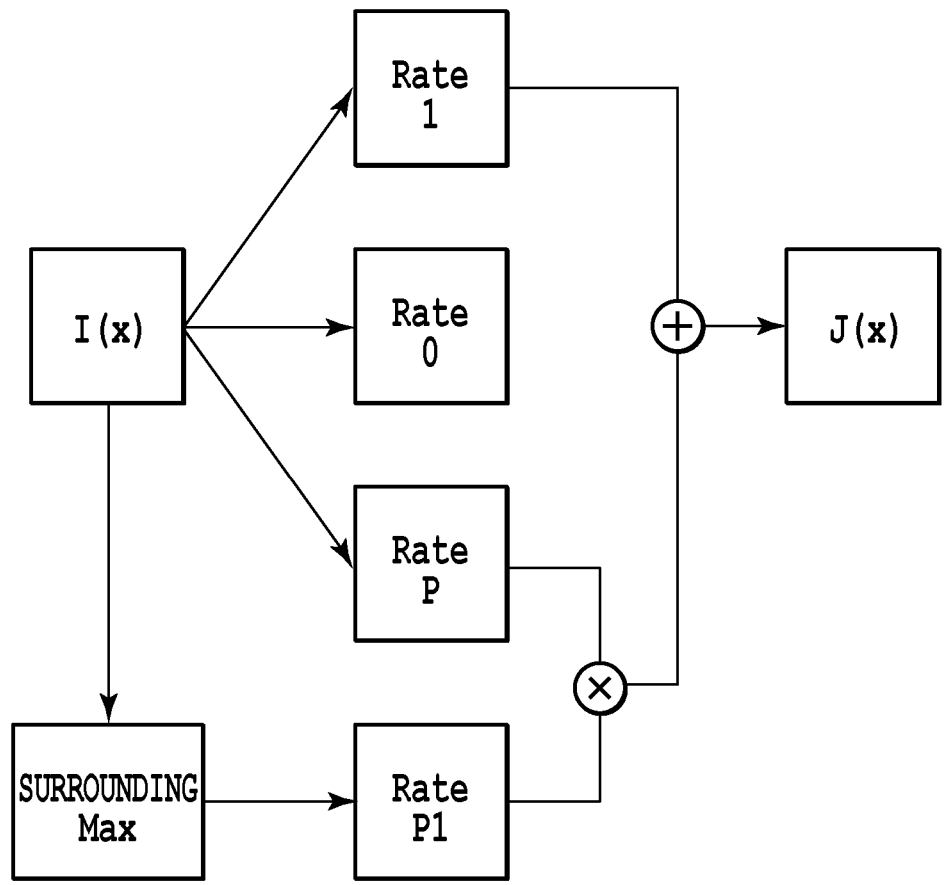
FIG. 20 is a conceptual diagram showing calculation in a stochastic resonance process adopted in a second embodiment.

FIG. 20 is a conceptual diagram for calculating J(x) in the present embodiment. In the first embodiment, Rate1, Rate0, and RateP for each pixel are used to calculate RateP1 of a target pixel as described with reference to FIG. 12. In contrast, in the present embodiment, a probability that the result of the first nonlinear process for a pixel having the maximum pixel value among eight pixels adjacent to a target pixel x is 1 is calculated based on eight input signals corresponding to the eight pixels, and the calculated probability is set as RateP1. Rate1, RateP, and RateP1 thus obtained are used, that is, the product of RateP and RateP1 is added to Rate1 based on Formula 10, thereby obtaining J(x). In the present embodiment, a singular portion in an image can be extracted with high accuracy in a relatively simple process like the first embodiment.

Third Embodiment

In the above embodiments, as shown in FIG. 9, a target pixel is binarized in the second nonlinear process based on the results of the first nonlinear process for eight pixels adjacent to the target pixel x in eight directions. However, in the case of extracting a white stripe extending in the Y direction as in the present embodiment, the efficiency may be improved by referring to only adjacent pixels in the Y direction in which the white stripe extends in StepB. Accordingly, in the present embodiment, the results of the first nonlinear process for only two pixels adjacent to the target pixel x in the Y direction is referred to in the second nonlinear process for the target pixel.

FIG. 14C shows a case where pixels to be referred to in StepB are changed from those in FIG. 14B described in the first embodiment to two pixels adjacent to the target pixel in the Y direction.

Figure 21A:
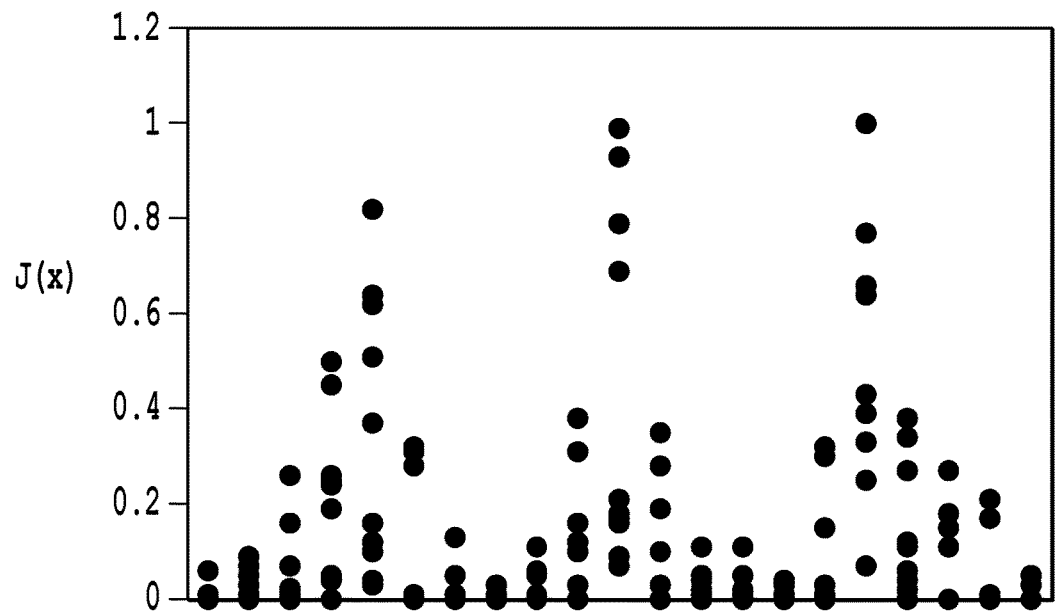
FIGS. 21A and 21B are graphs showing J(x)
Figure 21B:
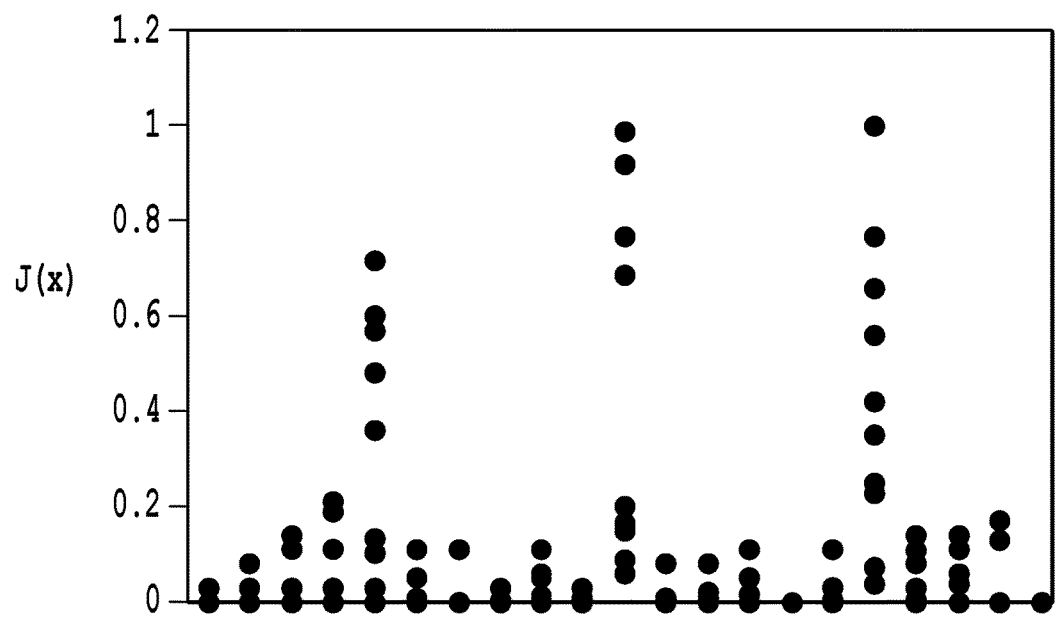

FIGS. 21A and 21B are graphs plotted by associating the values of J(x) with positions in the X direction. FIG. 21A shows a case where the results of the first nonlinear process for eight adjacent pixels are reflected like the first embodiment. FIG. 21B shows a case where the results of the first nonlinear process for two adjacent pixels in the Y direction are reflected like the present embodiment. In either graph, the positions of white stripes are clearly shown compared to the raw data in FIG. 13C. Moreover, the accuracy of FIG. 21B corresponding to the present embodiment, that is, the correlation of FIG. 21B with the data shown in FIG. 13A is higher than that of FIG. 21A corresponding to the first embodiment. In short, according to the present embodiment, a singular portion in an image can be extracted with higher accuracy in a relatively simple process. It should be noted that not only pixels adjacent to the target pixel but also pixels continuous in the Y direction may be referred to in StepB for binarizing the target pixel.

The above description uses a white stripe extending in the Y direction as an example, but the positions and number of pixels to be referred to in StepB may be variously changed according to the characteristics of a singular portion. For instance, if a singular portion tends to extend in a direction crossing the conveyance direction, that is, the X direction, it is effective to binarize the target pixel based on the ternarized values of pixels adjacent to the target pixel x in the X direction. If a singular portion tends to extend in any directions, pixels to be referred to in StepB may be pixels in a rectangular area elongated in the X or Y direction according to the degree of tendency, or may be pixels in a cross-shaped area having a width of one pixel in each of the X and Y directions. In either case, it is preferable that the positions and number of pixels to be referred to in StepB for binarizing the target pixel are optimized according to the tendency of a singular portion to be extracted.

Fourth Embodiment

In the above embodiments, if the result of the first nonlinear process is "0" or "1," the second nonlinear process is omitted, that is, "0" or "1" is used without any change. In contrast, in the present embodiment, even if the result of the first nonlinear process is "0" or "1," the value is changed in the second nonlinear process based on the results of the first nonlinear process for surrounding pixels.

Figure 22:
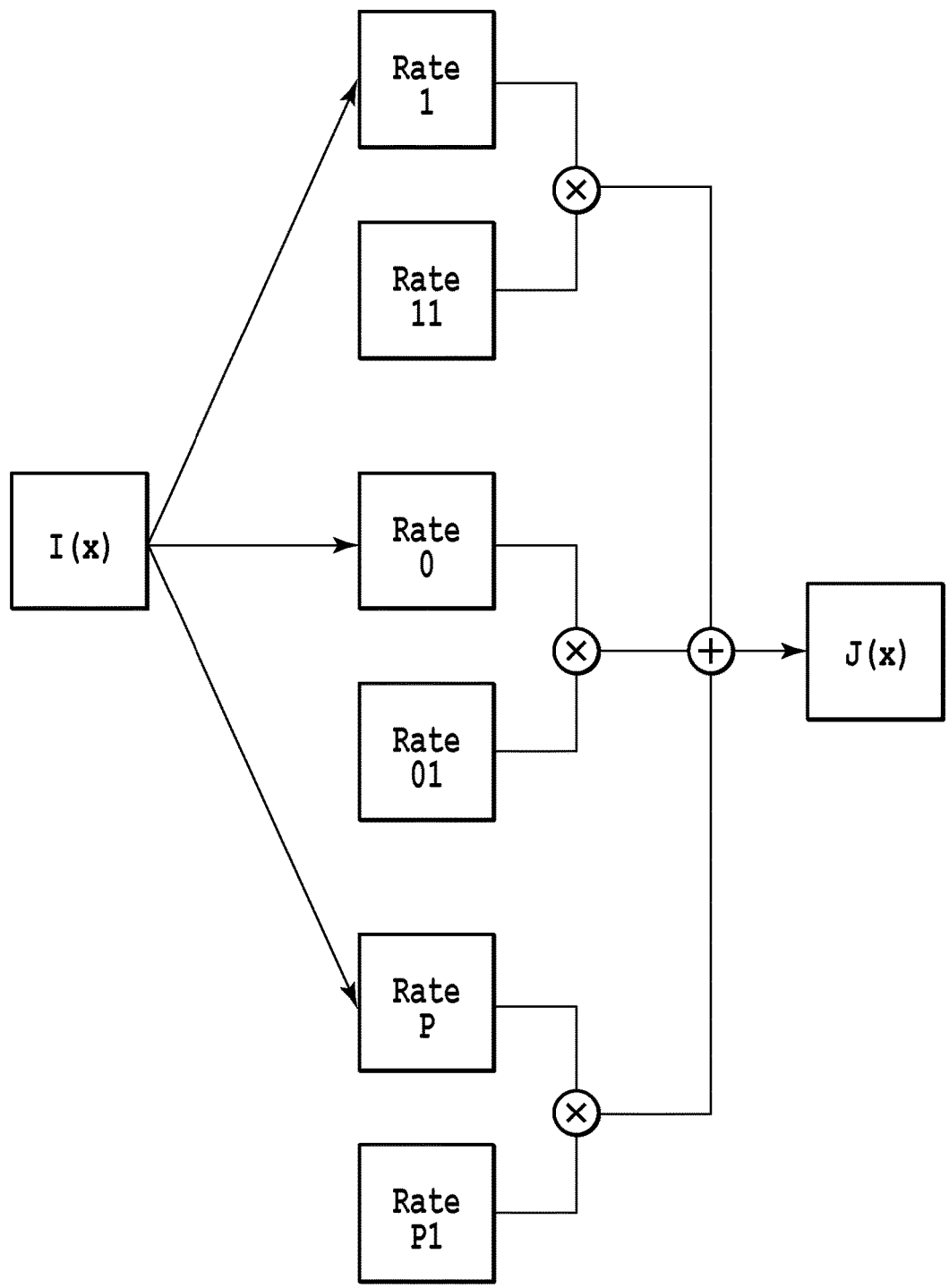
FIG. 22 is a conceptual diagram showing calculation in a stochastic resonance process adopted in a fourth embodiment.

FIG. 22 is a conceptual diagram for calculating J(x) in the present embodiment. In the present embodiment, Rate11 and Rate01 are prepared besides Rate1, Rate0, and RateP. Rate11 is a probability that the result of the second nonlinear process is "1" in a case where the result of the first nonlinear process is "1." Rate01 is a probability that the result of the second nonlinear process is "1" in a case where the result of the first nonlinear process is "0." Rate11, RateP1, and Rate01 decrease in this order, that is, Rate11>RateP1>Rate01.

This will be described in detail. For instance, even if the result of the first nonlinear process for a target pixel is "1," there is a low possibility that the target pixel is included in a singular portion provided that the result of the first nonlinear process is "0" in almost all the eight surrounding pixels. Accordingly, in this case, the output value of the target pixel is changed to "0" in the second nonlinear process. That is, in the present embodiment, Rate11 may be a probability that the number of pixels where the result of the first nonlinear process is "0" out of the eight surrounding pixels is less than or equal to N1.

On the other hand, even if the result of the first nonlinear process for a target pixel is "0," there is a high possibility that the target pixel is included in a singular portion provided that the result of the first nonlinear process is "1" in almost all the eight surrounding pixels. Accordingly, in this case, the output value of the target pixel is changed to "1" in the second nonlinear process. That is, in the present embodiment, Rate01 may be a probability that the number of pixels where the result of the first nonlinear process is "1" out of the eight surrounding pixels are greater than or equal to N2 (>N1).

In the present embodiment, J(x), that is, a probability that j(x, m)=1 in an arbitrary branch circuit m of the target pixel x can be expressed as follows:

$$J(x) = Rate1 \times Rate11 + Rate0 \times Rate01 + RateP \times RateP1 \quad \text{(Formula 19)}$$

According to the present embodiment, a singular portion in an image can be extracted with high accuracy in a relatively simple process while reflecting the circumstances of surrounding pixels more than the embodiments described above.

In the embodiments described above, a signal value is quantized to a ternarized value in the first nonlinear process and quantized to a binarized value in the second nonlinear process. However, the present invention is not limited to this. A signal value may be quantized to a quaternary or more value in the first nonlinear process as long as the second nonlinear process is executed based on the results of the first nonlinear process for a target pixel and surrounding pixels. In any case, the advantageous result of the present invention can be achieved, that is, a singular portion in an image can be extracted with high accuracy in a relatively simple process, as long as a signal value is quantized to a ternary or more value in the first nonlinear process and a probability J(x) that j(x, m)=1 can be finally calculated.

A system where the multifunction printer 6 shown in FIG. 3 is connected to the image processor 1 is described above as an example, but the present invention is not limited to this as a matter of course. The present invention can be implemented by a process of providing a system or apparatus with a program that performs one or more of the functions of the embodiments via a network or storage medium and loading and executing the program by one or more processors in a computer of the system or apparatus. The present invention can also be implemented by a circuit (e.g., an ASIC) that performs one or more of the functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-194064 filed Sep. 30, 2016, which is hereby incorporated by reference wherein in its entirety.

What is claimed is:

1. A signal processor comprising:
an acquisition unit configured to acquire input pixel signals I(x) corresponding to two-dimensionally arranged pixels (x), respectively; and
a processing unit configured to apply a predetermined stochastic resonance process to each of the input pixel signals I(x) acquired by the acquisition unit,
wherein the predetermined stochastic resonance process includes addition of noise obtained by multiplying generated random number by K to the input pixel signal I(x), a binarization process of comparing the result of the addition of the noise to the input pixel signal I(x) with a threshold T2 and a threshold T1 (where T2>T1), and a process of calculating a probability related to the result of the binarization process, the binarization process includes:

a first nonlinear process of outputting "0" in a case where the input pixel signal I(x) after the addition of the noise is less than the threshold T1, "1" in a case where the input pixel signal I(x) after the addition of the noise is greater than the threshold T2, and "P" in a case where the input pixel signal I(x) after the addition of the noise is greater than or equal to the threshold T1 and less than or equal to the second threshold T2; and a second nonlinear process of determining whether to output "1" or "0" for a processing target pixel, in which the result of the first nonlinear process is "P," based on input pixel signals of pixels around the processing target pixel, the second nonlinear process being subsequent to the first nonlinear process, and the process of calculating a probability is a process of calculating a probability J(x) that the result of the first nonlinear process is "1," or the result of the first nonlinear process is "P" and the result of the second nonlinear process is "1" in the binarization process.

2. The signal processor according to claim 1, wherein the process of calculating the probability J(x) includes a process of using the following formula for the input pixel signal I(x) as a process of obtaining a probability Rate1 that the result of the first nonlinear process is "1" in a case where the random number N is greater than 0 and less than 1 and a probability that the random number N is generated is f(N):

$$Rate1 = \begin{cases} 1 & \text{Pixel where } A2 < 0 \\ 0 & \text{Pixel where } A2 > 1 \\ 1 - \int_{N=0}^{A2} f(N) dN & \text{Pixel where } 0 \leq A2 \leq 1 \end{cases}$$

where $A2 = \dfrac{\{T2 - I(x)\}}{K}$.

3. The signal processor according to claim 2, wherein the process of calculating the probability J(x) includes a process of using the following formula for the input pixel signal I(x) as a process of obtaining a probability RateP that the result of the first nonlinear process is "P":

in a case where A2−A1>1, $$RateP = \begin{cases} 0 & \text{Pixel where } A2 < 0 \\ 1 - \int_{N=0}^{A2} f(N) dN & \text{Pixel where } 0 \leq A2 \leq 1 \text{ and } A1 < 0 \\ \int_{N=A1}^{A2} f(N) dN & \text{Pixel where } 0 < A1 \text{ and } A2 < 1 \\ 1 - \int_{N=A1}^{1} f(N) dN & \text{Pixel where } 1 \leq A2 \text{ and } 0 \leq A1 \leq 1 \\ 0 & \text{Pixel where } A1 > 1 \end{cases}$$

-continued where $A1 = \dfrac{T1 - I(x)}{K}$.

and in a case where $A2-A1 \leq 1$, $$RateP = \begin{cases} 0 & \text{Pixel where } A1 < 0 \\ 1 - \int_{N=0}^{A2} f(N)\,dN & \text{Pixel where } 0 \leq A2 \leq 1 \text{ and } A1 < 0 \\ 1 & \text{Pixel where } 1 < A2 \text{ and } A1 < 0 \\ 1 - \int_{N=A1}^{1} f(N)\,dN & \text{Pixel where } 1 \leq A2 \text{ and } 0 \leq A1 \leq 1 \\ 0 & \text{Pixel where } A1 > 1 \end{cases}$$

4. The signal processor according to claim 1, wherein in a case where the result of the first nonlinear process for the processing target pixel is "P", the second nonlinear process outputs "1" on the condition that the result of the first nonlinear process for one or more of pixels adjacent to the processing target pixel is "1", and outputs "0" on the condition that the result of the first nonlinear process for none of the pixels adjacent to the processing target pixel is "1".

5. The signal processor according to claim 1, wherein the second nonlinear process determines the result of the second nonlinear process for the processing target pixel based on the result of the first nonlinear process for pixels adjacent to the processing target pixel in a predetermined direction out of the pixels around the processing target pixel.

6. The signal processor according to claim 1, wherein the noise is white noise.

7. The signal processor according to claim 1, wherein the noise is noise having a normal distribution.

8. The signal processor according to claim 1, further comprising a notification unit configured to provide notification of the existence of a singular portion in an image based on the result of the predetermined stochastic resonance process.

9. The signal processor according to claim 1, further comprising a printing unit configured to print an image and a reading unit configured to read the image,
wherein the input pixel signals $I(x)$ are image signals obtained by reading the image by the reading unit.

10. A signal processor comprising:
an acquisition unit configured to acquire input pixel signals $I(x)$ corresponding to two-dimensionally arranged pixels (x), respectively; and
a processing unit configured to apply a predetermined stochastic resonance process to each of the input pixel signals $I(x)$ acquired by the acquisition unit,
wherein the predetermined stochastic resonance process includes addition of noise obtained by multiplying generated random number by K to the input pixel signal $I(x)$, a first process of obtaining Rate1, RateP, and RateP1 by using the result of the addition of the noise to the input pixel signal $I(x)$ and two thresholds T2 and T1 (where T2>T1), and a second process of obtaining an output signal $J(x)$ from Rate1, RateP, and RateP1, wherein
(I) on the assumption that, in a case where the random numbers N is greater than 0 and less than 1, a probability that random numbers N is generated is expressed by f(N), (I-i) the first process obtains Rate1 based on the following formula:

$$Rate1 = \begin{cases} 1 & \text{Pixel where } A2 < 0 \\ 0 & \text{Pixel where } A2 > 1 \\ 1 - \int_{N=0}^{A2} f(N)\,dN & \text{Pixel where } 0 \leq A2 \leq 1 \end{cases}$$

where $A2 = \dfrac{\{T2 - I(x)\}}{K}$, (I-ii) the first process obtains RateP based on the following formula:
in a case where $A2-A1>1$, $$RateP = \begin{cases} 0 & \text{Pixel where } A1 < 0 \\ 1 - \int_{N=0}^{A2} f(N)\,dN & \text{Pixel where } 0 \leq A2 \leq 1 \text{ and } A1 < 0 \\ 1 & \text{Pixel where } 1 < A2 \text{ and } A1 < 0 \\ 1 - \int_{N=A1}^{1} f(N)\,dN & \text{Pixel where } 1 \leq A2 \text{ and } 0 \leq A1 \leq 1 \\ 0 & \text{Pixel where } A1 > 1 \end{cases}$$

and in a case where $A2-A1 \leq 1$, $$RateP = \begin{cases} 0 & \text{Pixel where } A2 < 0 \\ 1 - \int_{N=0}^{A2} f(N)\,dN & \text{Pixel where } 0 \leq A2 \leq 1 \text{ and } A1 < 0 \\ \int_{N=A1}^{A2} f(N)\,dN & \text{Pixel where } 0 < A1 \text{ and } A2 < 1 \\ 1 - \int_{N=A1}^{1} f(N)\,dN & \text{Pixel where } 1 \leq A2 \text{ and } 0 \leq A1 \leq 1 \\ 0 & \text{Pixel where } A1 > 1 \end{cases}$$

where $A1 = \dfrac{T1 - I(x)}{K}$, and (I-iii) the first process obtains RateP1 as a value corresponding to a probability that a value obtained by adding the noises to pixel signals of pixels around the processing target signal is greater than T2, and
(II) the second process obtains the output signal $J(x)$ based on the following formula:

$J(x) = Rate1 + RateP \times RateP1$.

11. The signal processor according to claim 10, wherein RateP1 is a value corresponding to a probability that a value obtained by adding the noise to a pixel signal of at least one pixel adjacent to the processing target signal is greater than T2.

12. The signal processor according to claim 10, wherein RateP1 is a value corresponding to a probability that a value obtained by adding the noise to the highest input pixel signal $I(x)$ out of input pixel signals $I(x)$ of pixels adjacent to the processing target signal is greater than T2.

13. A signal processing method comprising:
an acquisition step of acquiring input pixel signals $I(x)$ corresponding to two-dimensionally arranged pixels (x), respectively; and
a processing step of applying a predetermined stochastic resonance process to each of the input pixel signals $I(x)$ acquired in the acquisition step, wherein the predetermined stochastic resonance process includes addition of noise obtained by multiplying generated random number by K to the input pixel signal I(x), a binarization process of comparing the result of the addition of the noise to the input pixel signal I(x) with a threshold T2 and a threshold T1 (where T2>T1), and a process of calculating a probability related to the result of the binarization process, the binarization process includes:

a first nonlinear process of outputting "0" in a case where the input pixel signal I(x) after the addition of the noise is less than the threshold T1, "1" in a case where the input pixel signal I(x) after the addition of the noise is greater than or equal to the threshold T2, and "P" in a case where the input pixel signal I(x) after the addition of the noise is greater than or equal to the threshold T1 and less than the second threshold T2; and a second nonlinear process of determining whether to output "1" or "0" for a processing target pixel, in which the result of the first nonlinear process is "P," based on input pixel signals of pixels around the processing target pixel, the second nonlinear process being subsequent to the first nonlinear process, and the process of calculating a probability is a process of calculating a probability J(x) that the result of the first nonlinear process is "1," or the result of the first nonlinear process is "P" and the result of the second nonlinear process is "1" in the binarization process.

14. The signal processing method according to claim 13, wherein the process of calculating the probability J(x) includes a process of using the following formula for the input pixel signal I(x) as a process of obtaining a probability Rate1 that the result of the first nonlinear process is "1" in a case where the random number N is greater than 0 and less than 1 and a probability that the random number N is generated is f(N):

$$Rate1 = \begin{cases} 1 & \text{Pixel where } A2 < 0 \\ 0 & \text{Pixel where } A2 > 1 \\ 1 - \int_{N=0}^{A2} f(N)dN & \text{Pixel where } 0 \le A2 \le 1 \end{cases}$$

where $A2 = \dfrac{\{T2 - I(x)\}}{K}$.

15. The signal processing method according to claim 14, wherein the process of calculating the probability J(x) includes a process of using the following formula for the input pixel signal I(x) as a process of obtaining a probability RateP that the result of the first nonlinear process is "P":

in a case where A2−A1>1, $$RateP = \begin{cases} 0 & \text{Pixel where } A1 < 0 \\ 1 - \int_{N=0}^{A2} f(N)dN & \text{Pixel where } 0 \le A2 \le 1 \text{ and } A1 < 0 \\ 1 & \text{Pixel where } 1 < A2 \text{ and } A1 < 0 \\ 1 - \int_{N=A1}^{1} f(N)dN & \text{Pixel where } 1 \le A2 \text{ and } 0 \le A1 \le 1 \\ 0 & \text{Pixel where } A1 > 1 \end{cases}$$

and in a case where A2−A1≤1, $$RateP = \begin{cases} 0 & \text{Pixel where } A2 < 0 \\ 1 - \int_{N=0}^{A2} f(N)dN & \text{Pixel where } 0 \le A2 \le 1 \text{ and } A1 < 0 \\ \int_{N=A1}^{A2} f(N)dN & \text{Pixel where } 0 < A1 \text{ and } A2 < 1 \\ 1 - \int_{N=A1}^{1} f(N)dN & \text{Pixel where } 1 \le A2 \text{ and } 0 \le A1 \le 1 \\ 0 & \text{Pixel where } A1 > 1 \end{cases}$$

where $A1 = \dfrac{T1 - I(x)}{K}$.

16. The signal processing method according to claim 13, wherein in a case where the result of the first nonlinear process for the processing target pixel is "P", the second nonlinear process outputs "1" on the condition that the result of the first nonlinear process for one or more of pixels adjacent to the processing target pixel is "1", and outputs "0" on the condition that the result of the first nonlinear process for none of the pixels adjacent to the processing target pixel is "1".

17. The signal processing method according to claim 13, wherein the second nonlinear process determines the result of the second nonlinear process for the processing target pixel based on the result of the first nonlinear process for pixels adjacent to the processing target pixel in a predetermined direction out of the pixels around the processing target pixel.

18. The signal processing method according to claim 13, wherein the noise is white noise.

19. The signal processing method according to claim 13, wherein the noise is noise having a normal distribution.

20. The signal processing method according to claim 13, further comprising a notification step of providing notification of the existence of a singular portion in an image based on the result of the predetermined stochastic resonance process.

21. The signal processing method according to claim 13, further comprising a printing step of printing an image and a reading step of reading the image,
wherein the input pixel signals I(x) are image signals obtained by reading the image in the reading step.

22. A non-transitory computer-readable storage medium storing a program for causing one or more processors to perform a control method comprising:
an acquisition step of acquiring input pixel signals I(x) corresponding to two-dimensionally arranged pixels (x), respectively; and
a processing step of applying a predetermined stochastic resonance process to each of the input pixel signals I(x) acquired in the acquisition step,
wherein the predetermined stochastic resonance process includes addition of noise obtained by multiplying generated random number by K to the input pixel signal I(x), a binarization process of comparing the result of the addition of the noise to the input pixel signal I(x) with a threshold T2 and a threshold T1 (where T2>T1), and a process of calculating a probability related to the result of the binarization process,
the binarization process includes:
a first nonlinear process of outputting "0" in a case where the input pixel signal I(x) after the addition of the noise is less than the threshold T1, "1" in a case where the input pixel signal I(x) after the addition of the noise is greater than or equal to the threshold T2, and "P" in a case where the input pixel signal I(x) after the addition of the noise is greater than the threshold T1 and less than or equal to the second threshold T2; and a second nonlinear process of determining whether to output "1" or "0" for a processing target pixel, in which the result of the first nonlinear process is "P," based on input pixel signals of pixels around the processing target pixel, the second nonlinear process being subsequent to the first nonlinear process, and the process of calculating a probability is a process of calculating a probability J(x) that the result of the first nonlinear process is "1," or the result of the first nonlinear process is "P" and the result of the second nonlinear process is "1" in the binarization process.

23. The storage medium according to claim 22, wherein the process of calculating the probability J(x) includes a process of using the following formula for the input pixel signal I(x) as a process of obtaining a probability Rate1 that the result of the first nonlinear process is "1" in a case where the random number N is greater than 0 and less than 1 and a probability that the random number N is generated is f(N):

$$Rate1 = \begin{cases} 1 & \text{Pixel where } A2 < 0 \\ 0 & \text{Pixel where } A2 > 1 \\ 1 - \int_{N=0}^{A2} f(N)\,dN & \text{Pixel where } 0 \leq A2 \leq 1 \end{cases}$$

where $A2 = \dfrac{\{T2 - I(x)\}}{K}$.

24. The storage medium according to claim 23, wherein the process of calculating the probability J(x) includes a process of using the following formula for the input pixel signal I(x) as a process of obtaining a probability RateP that the result of the first nonlinear process is "P":

in a case where A2−A1>1, $$RateP = \begin{cases} 0 & \text{Pixel where } A1 < 0 \\ 1 - \int_{N=0}^{A2} f(N)\,dN & \text{Pixel where } 0 \leq A2 \leq 1 \text{ and } A1 < 0 \\ 1 & \text{Pixel where } 1 < A2 \text{ and } A1 < 0 \\ 1 - \int_{N=A1}^{1} f(N)\,dN & \text{Pixel where } 1 \leq A2 \text{ and } 0 \leq A1 \leq 1 \\ 0 & \text{Pixel where } A1 > 1 \end{cases}$$

and in a case where A2−A1≤1, $$RateP = \begin{cases} 0 & \text{Pixel where } A2 < 0 \\ 1 - \int_{N=0}^{A2} f(N)\,dN & \text{Pixel where } 0 \leq A2 \leq 1 \text{ and } A1 < 0 \\ \int_{N=A1}^{A2} f(N)\,dN & \text{Pixel where } 0 < A1 \text{ and } A2 < 1 \\ 1 - \int_{N=A1}^{1} f(N)\,dN & \text{Pixel where } 1 \leq A2 \text{ and } 0 \leq A1 \leq 1 \\ 0 & \text{Pixel where } A1 > 1 \end{cases}$$

where $A1 = \dfrac{T1 - I(x)}{K}$.

25. The storage medium according to claim 22, wherein in a case where the result of the first nonlinear process for the processing target pixel is "P", the second nonlinear process outputs "1" on the condition that the result of the first nonlinear process for one or more of pixels adjacent to the processing target pixel is "1", and outputs "0" on the condition that the result of the first nonlinear process for none of the pixels adjacent to the processing target pixel is "1".

26. The storage medium according to claim 22, wherein the second nonlinear process determines the result of the second nonlinear process for the processing target pixel based on the result of the first nonlinear process for pixels adjacent to the processing target pixel in a predetermined direction out of the pixels around the processing target pixel.

27. The storage medium according to claim 22, wherein the noise is white noise.

28. The storage medium according to claim 22, wherein the noise is noise having a normal distribution.

* * * * *